US011927473B2

(12) United States Patent
Wilson et al.

(10) Patent No.: US 11,927,473 B2
(45) Date of Patent: Mar. 12, 2024

(54) MULTI-FIBER SENSING TOPOLOGY FOR SUBSEA WELLS

(71) Applicant: Halliburton Energy Services, Inc., Houston, TX (US)

(72) Inventors: Glenn Wilson, Houston, TX (US); Mikko K. Jaaskelainen, Houston, TX (US); Kwang Il Suh, Houston, TX (US); John Laureto Maida, Houston, TX (US); Michel LeBlanc, Houston, TX (US); Andreas Ellmauthaler, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 17/867,961

(22) Filed: Jul. 19, 2022

(65) Prior Publication Data

US 2024/0027258 A1    Jan. 25, 2024

(51) Int. Cl.
*G01H 9/00* (2006.01)
*G01D 5/353* (2006.01)
(Continued)

(52) U.S. Cl.
CPC ......... *G01H 9/004* (2013.01); *G01D 5/35316* (2013.01); *G01D 5/35364* (2013.01);
(Continued)

(58) Field of Classification Search
CPC .............. G01H 9/004; G01D 5/35316; G01D 5/35364; G01D 5/35387; G01K 11/322;
(Continued)

(56) References Cited

U.S. PATENT DOCUMENTS

| 8,988,671 B2 * | 3/2015 | Zhang | G01D 5/35364 |
| | | | 356/73.1 |
| 10,359,302 B2 * | 7/2019 | Hartog | G01D 5/35364 |
| | (Continued) | | |

FOREIGN PATENT DOCUMENTS

WO    2021067662    4/2021

OTHER PUBLICATIONS

International Search Report and Written Opinion for International Patent Application No. PCT/US2022/039456 dated Apr. 18, 2023.
(Continued)

*Primary Examiner* — Seung C Sohn
(74) *Attorney, Agent, or Firm* — John Wustenberg; C. Tumey Law Group PLLC

(57) ABSTRACT

A fiber optic sensing (FOS) system may include a Brillouin Optical Time Domain Analyzer (BOTDA) unit, a first fiber optical cable optically connected to the BOTDA interrogator unit at a first end, and an optical feedthrough system (OFS) optically connected the first fiber optical cable at a second end of the first fiber optical cable. The FOS system may further comprise a fiber optic cable forming a loop within a wellbore that is optically connected to the first fiber optical cable at the OFS and a second fiber optical cable optically connected to the loop at the OFS and wherein the second fiber optical cable is optically connected to the BOTDA interrogator unit.

20 Claims, 23 Drawing Sheets

(51) Int. Cl.
*G01K 11/322* (2021.01)
*G01K 11/324* (2021.01)
*G01V 1/22* (2006.01)
*G01V 1/52* (2006.01)
*G01V 8/16* (2006.01)

(52) U.S. Cl.
CPC ....... *G01D 5/35387* (2013.01); *G01K 11/322* (2021.01); *G01K 11/324* (2021.01); *G01V 1/226* (2013.01); *G01V 1/52* (2013.01); *G01V 8/16* (2013.01); *G01V 2210/1429* (2013.01)

(58) Field of Classification Search
CPC ........ G01K 11/324; G01V 1/226; G01V 1/52; G01V 8/16; G01V 2210/1429
See application file for complete search history.

(56) References Cited

U.S. PATENT DOCUMENTS

| | | | |
|---|---|---|---|
| 10,955,575 | B2 | 3/2021 | LeBlanc et al. |
| 2002/0057436 | A1 | 5/2002 | Skinner et al. |
| 2006/0115204 | A1 | 6/2006 | Marsh et al. |
| 2015/0198503 | A1 | 7/2015 | Leblanc et al. |
| 2016/0222777 | A1 | 8/2016 | LeBlanc et al. |
| 2018/0058196 | A1 | 3/2018 | Jaaskelainen et al. |
| 2018/0252555 | A1 | 9/2018 | LeBlanc et al. |
| 2019/0204192 | A1 | 7/2019 | Jaaskelainen et al. |
| 2019/0235104 | A1 | 8/2019 | Suh |
| 2019/0301278 | A1 | 10/2019 | Jaaskelainen et al. |
| 2019/0369276 | A1 | 12/2019 | Barfoot et al. |
| 2020/0362692 | A1 | 11/2020 | Ellmauthaler et al. |
| 2021/0096020 | A1 | 4/2021 | Stark et al. |
| 2021/0131276 | A1 | 5/2021 | LeBlanc et al. |
| 2021/0173111 | A1 | 6/2021 | Therrien et al. |
| 2021/0199825 | A1 | 7/2021 | LeBlanc et al. |
| 2021/0239549 | A1 | 8/2021 | Maida et al. |
| 2021/0270131 | A1 | 9/2021 | Ellmauthaler et al. |
| 2021/0270667 | A1 | 9/2021 | Ellmauthaler et al. |
| 2021/0301653 | A1 | 9/2021 | Jaaskelainen et al. |
| 2021/0405232 | A1 | 12/2021 | LeBlanc et al. |
| 2022/0145755 | A1 | 5/2022 | Ellmauthaler et al. |
| 2022/0186612 | A1 | 6/2022 | Maida, Jr. et al. |
| 2022/0206172 | A1 | 6/2022 | Wilson et al. |
| 2022/0214468 | A1 | 7/2022 | Ellmauthaler et al. |

OTHER PUBLICATIONS

U.S. Appl. No. 17/402,094 dated Aug. 13, 2021.
U.S. Appl. No. 16/587,607 dated Sep. 30, 2019.
U.S. Appl. No. 16/586,091 dated Sep. 27, 2019.
U.S. Appl. No. 16/806,930 dated Mar. 2, 2020.
U.S. Appl. No. 17/095,065 dated Nov. 11, 2020.
U.S. Appl. No. 17/137,112 dated Dec. 29, 2020.
U.S. Appl. No. 17/518,240 dated Nov. 3, 2021.
U.S. Appl. No. 17/727,414 dated Apr. 22, 2022.

* cited by examiner

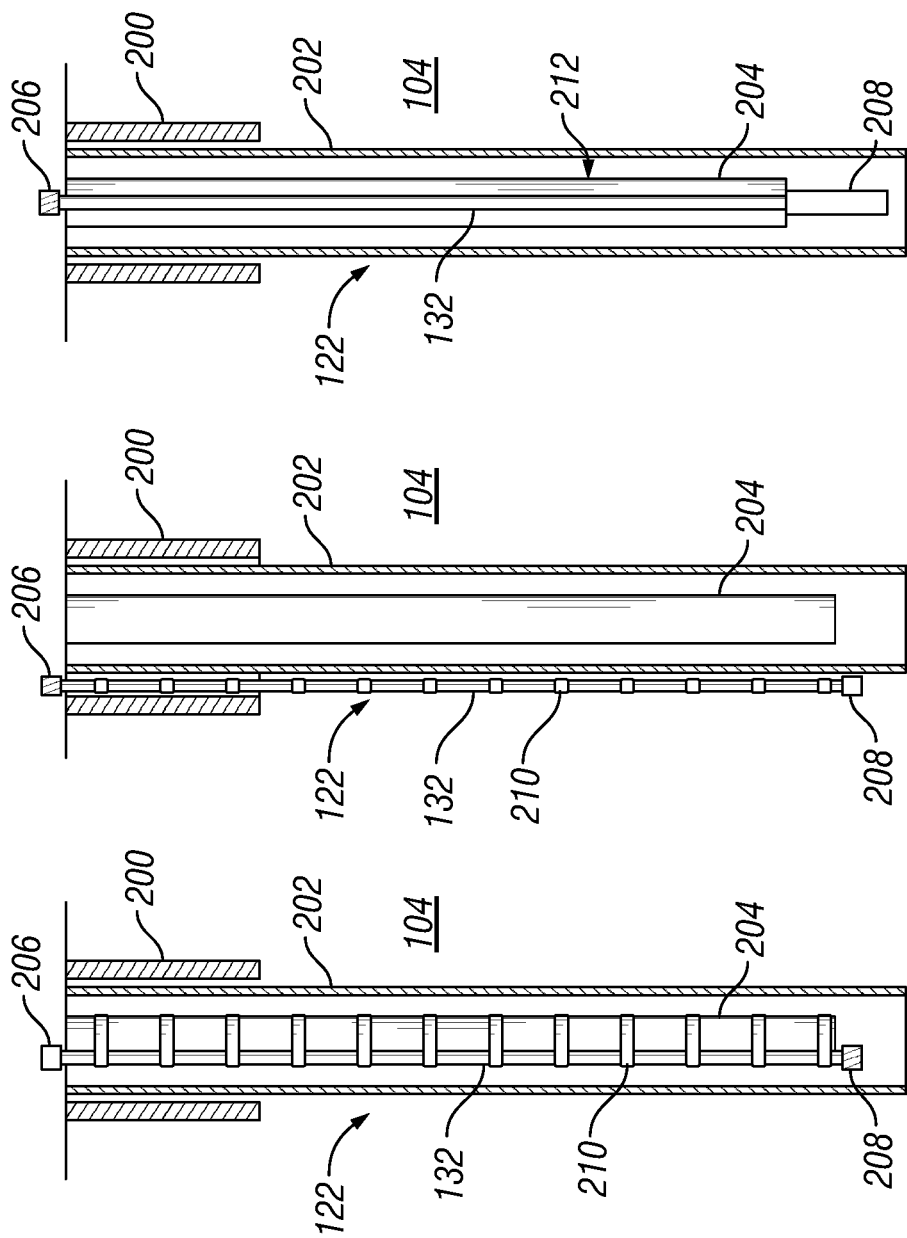

MULTI-FIBER SENSING TOPOLOGY FOR SUBSEA WELLS

BACKGROUND

Boreholes drilled into subterranean formations may enable recovery of desirable fluids (e.g., hydrocarbons), or geological storage of other fluids (e.g., carbon dioxide), using a number of different techniques. A number of fiber optic sensing (FOS) systems and techniques may be employed in subterranean operations to characterize and monitor borehole and/or formation properties. For example, Distributed Temperature Sensing (DTS), Distributed Strain Sensing (DSS), and Distributed Acoustic Sensing (DAS) along with a fiber optic system may be utilized together to determine borehole and/or formation properties including but not limited to production profiling, solids production, injection profiling, flow assurance, vertical seismic profiling, well integrity, geological integrity, and leak detection. Distributed fiber optic sensing is a cost-effective method of obtaining real-time, high-resolution, highly accurate temperature and/or strain (static or dynamic, including acoustic) and/or pressure data along the entire wellbore. Discrete (or point) fiber optic sensing, e.g., by using fiber Bragg gratings (FBGs), is an alternative cost-effective method of obtaining real-time, high resolution, highly accurate temperature and/or strain data at discrete locations along the wellbore. Moreover, FBGs and the downhole cable may be integrated with transducers capable of inducing temperature and/or strain upon at least one FBG, thus providing an optically proportional measure of transduction, e.g., for sensing pressure, voltage, current, or chemical concentration. Additionally, fiber optic sensing may eliminate downhole electronic complexity by shifting all electrical and electro-optical systems to the surface within the interrogator unit(s). Fiber optic cables may be permanently deployed downhole in a wellbore via single- or dual-trip completion strings, behind casing, on tubing, or in pumped down installations; or temporally via coiled tubing, wireline, slickline, or disposable cables.

Distributed fiber optic sensing can be enabled by continuously sensing along the length of the optical fiber, and effectively assigning discrete measurements to a position or set of positions along the length of the fiber via optical time-domain reflectometry (OTDR). That is, by knowing the velocity of light in fiber, and by measuring the time it takes the backscattered light to return to the detector inside the interrogator, it is possible to assign a measurement and distance along the fiber. In alternative embodiments, functionally equivalent distributed fiber optic sensing data may be acquired via optical frequency-domain reflectometry (OFDR) techniques.

DAS, DSS, DTS, and FBG sensing has been practiced for monitoring downhole sensing fibers in dry Christmas tree (or dry-tree) wells to enable interventionless, time-lapse temperature, acoustic, and pressure monitoring borehole and/or formation properties including but not limited to production profiling, solids production, injection profiling, flow assurance, vertical seismic profiling, well integrity, geological integrity, and leak detection. For installation in dry-tree wells, multiple sensing fibers are typically integrated in a tubing encapsulated fiber (TEF) cable. This enables, for example, a Distributed Acoustic Sensing (DAS) system to preferentially sense a single-mode downhole sensing fiber, and a Raman-based DTS system to preferentially sense a multi-mode downhole sensing fiber; such that the DAS and DTS systems are operated simultaneously but are not simultaneously sensing the same downhole sensing fiber. Typically, the interrogator units are adjacent to, or a short distance, from the well head outlet on the dry Christmas tree.

For downhole sensing fibers installed in subsea wells, marinization of the interrogator(s) (i.e., packaging interrogators for deployment on a structure residing on the sea floor proximal to a subsea Christmas tree) introduces significant complexity and cost to the Subsea Production System (SPS) and related electrical and optical distribution systems and does not readily permit interrogator hardware upgrades. It is preferable to maintain any interrogator system(s) on the topside facility, and to sense the downhole sensing fiber through optical distribution in the subsea infrastructure. However, such a subsea well sensing operation then requires optical engineering solutions to compensate for insertion losses accumulated through long (~5 to 100+ km) lengths of subsea transmission fiber between the topside facility and subsea tree (e.g., static umbilical lines, dynamic umbilical lines, jumper cables, optical flying leads), up to 10 km of downhole sensing fiber, and multiple wet- and dry-mate optical connectors, splices, and an optical feedthrough systems (OFS) in the subsea Christmas tree (XT).

The current (horizontal or vertical) subsea XT OFS by TE Connectivity enables optical wet-mating of a single fiber when the XT is landed on the tubing hanger. Thus, the number of downhole sensing fibers in a subsea well is currently limited to one. However, multi-fiber OFSs are being developed, and will enable multiple (e.g., three to six) downhole sensing fibers in a subsea well. Whether one or more downhole sensing fibers are installed in the subsea well, they require optical continuity back to the topsides facility so the backscattered light can be received by the interrogator(s). The optical connectors used in the subsea infrastructure (e.g., at umbilical termination assemblies, optical distribution units, drill centers, optical flying leads, and subsea trees) are finite in their optical circuit (or pin) count. For example, current wet-mate connector technology may support eight, twelve, or twenty-four pins. Also, there are physical limits (i.e., real estate) as to how many connector receptacles may be installed on subsea equipment. For example, umbilical termination assemblies (UTAs) may terminate multiple electric, hydraulic, and fiber optic cables through a finite number of electrical, hydraulic, and optical connector receptacles be mounted on their remotely operated vehicle (ROV) panels. Thus, without an efficient method to manage optical distribution, there is considerable complexity and cost when contemplating the use of multiple downhole sensing fibers in multiple subsea wells.

While some fiber optic sensing techniques such as DAS and DTS may be operated simultaneously or sequentially or periodically on the same downhole sensing fiber, having additional downhole sensing fibers may allow for other simultaneous, sequential, or periodic sensing applications, such as arrays of discrete pressure and temperature gauges via an FBG system. Currently, there exist an inability to maximize the number of downhole sensing fibers in a wellbore while minimizing the number of subsea transmission fibers between the interrogator(s) located at the topside facility and the OFS.

BRIEF DESCRIPTION OF THE DRAWINGS

These drawings illustrate certain aspects of some examples of the present disclosure and should not be used to limit or define the disclosure.

FIGS. 2A-2C illustrates examples of a downhole fiber deployed in a wellbore;

DETAILED DESCRIPTION

Figure 1A:
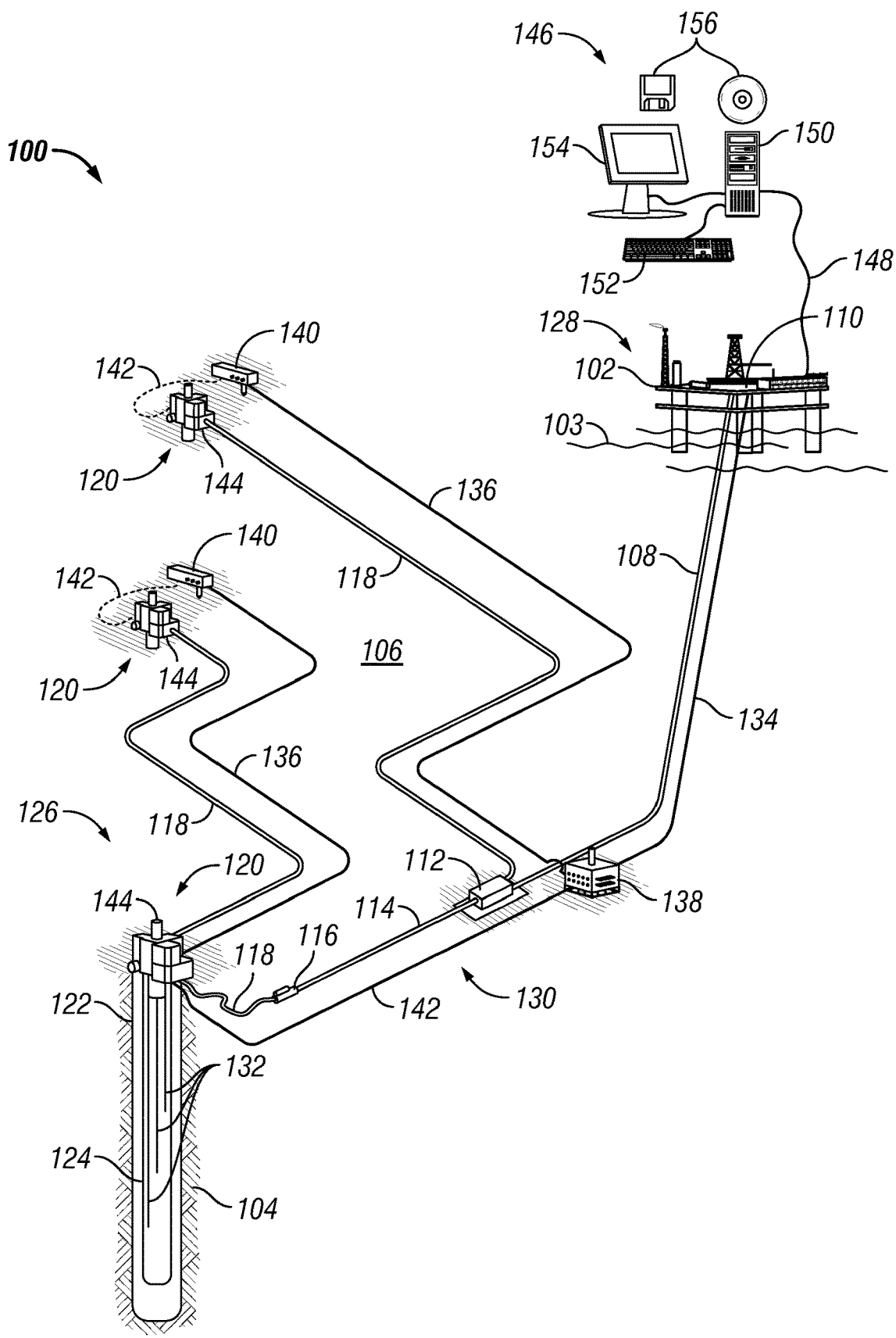
FIGS. 1A and 1B illustrate an example of a well measurement system in a subsea environment.

The present disclosure relates generally to a system and method for fiber optic sensing, which may include but not limited to Fiber Bragg Gratings (FBGs), Distributed Acoustic Sensing (DAS), Distributed Temperature Sensing (DTS), Distributed Strain Sensing (DSS), Distributed Chemical Sensing (DCS), Distributed Magnetomotive Force Sensing (DMS), Distributed Electromotive Force Sensing (DES), and Distributed Brillouin-Frequency Sensing (DBFS), the latter which may be used in the extraction of distributed strain, temperature, or pressure or a combination thereof. It should be noted that any, or any combination of all systems and methods described above are generally referred to as a Fiber Optic Sensing (FOS) system. Subsea well sensing operations may present optical challenges which may relate to the signal fidelity and quality of FOS system given the long transmission fiber and multiple optical connections required to lead into the downhole sensing fibers. The sensing region of interest is typically the downhole sensing fiber (i.e., the in-well and reservoir sections), and not the transmission fibers (i.e., OFLs, jumpers, and static and/or dynamic umbilical lines).

To prevent a reduction in FOS signal-to-noise (SNR) and signal quality and fidelity, the FOS system described below may increase the returned signal strength with given pulse power for emitted light, decrease the noise floor of the receiving optics to detect weaker power pulses, maintain the pulse power as high as possible as it propagates along the transmission fiber(s), increase the number of light pulses that may be launched into the downhole sensing fiber(s) per second, and/or increase the maximum pulse power that may be used for given fiber length.

FOS systems utilize one or more downhole sensing fibers integrated in fiber optic cables (or tubing encapsulated fibers, TEFs). One or more electrical conductors may be integrated in the TEF so as to provide electrical power and/or telemetry to a downhole device, e.g., a pressure gauge. Downhole sensing fibers may be at least one single-mode fiber (SMF), at least one multi-mode fibers (MMF), or a combination of at least one SMF and at least one MMF. Each of the at least one SMF or MMF may be treated with a coating to prevent undesirable effects, e.g., hermetically sealed in carbon to delay hydrogen degradation. Each of at least one SMF or MMF may be treated with a coating to generate desirable effects, e.g., induced strain via improved strain transduction, a chemical reaction, or exposure to an electromotive or magnetomotive force. At least one SMF may further be enhanced (or engineered) to yield a higher-than-Rayleigh scattering coefficient so as to increase the Distributed Acoustic Sensing (DAS) signal to noise ratio (SNR) by 10 dB to 20 dB. Such enhanced backscatter fibers (EBF) may consist of either weak, distributed gratings, or discrete gratings in a SMF. The EBF may be fabricated with a narrow-enhanced backscatter bandwidth, such that a DAS system may be sensitive to the enhanced backscatter, but at least one other FOS system does not exhibit any appreciable sensitivity to the enhanced backscatter than it would if sensing a standard (or non-enhanced) SMF. The EBF may be fabricated with a broad enhanced bandwidth, such that a DAS system and at least one other FOS system may exhibit sensitivity to the enhanced backscatter.

Fiber optic cables may be permanently deployed in a subsea well via single- or dual-trip completions. Fiber optic cables may include one of at least one optical fiber encapsulated in a hydrogen-scavenging gel-filled stainless-steel tube and may further be encapsulated in a metallic (e.g., Inconel® alloy 825) armor. A hydrogen delay barrier may be located between the stainless-steel tube and the armor, e.g., a metallurgical hydrogen delay barrier such as aluminum may be extruded upon the stainless-steel tube before encapsulation in the metallic armor. The fiber optic cables may be further encapsulated in a thermoplastic encapsulation. As discussed above and below, fiber optic cables may comprise one for more fiber optic lines. Additionally, fiber optic cables may be referred to fiber optic lines and are interchangeable for this disclosure.

FOS systems utilize transmission fibers integrated in the subsea infrastructure fiber optic cables to provide optical continuity between the interrogator(s) located at the topside facility and downhole sensing fiber(s) in the subsea well. The transmission fibers may be integrated within OFLs, jumpers, and static and/or dynamic umbilical lines, and optically coupled via splices, wet-mate connectors, and/or dry-mate connectors. Transmission fibers may be either SMF or MMF. In some embodiments, the transmission fibers may be low-loss (LL) or ultra-low loss (ULL) SMFs that have lower optical attenuation and higher power handling capability before non-linearity so as to enable high gain, co- or counter-propagating distributed Raman amplification. For example, pure silica core SMF, such as Corning® SMF-28® ULL SMF, typically exhibit 0.15 to 0.17 dB/km optical attenuation at 1550 nm wavelengths.

FOS systems may employ distributed fiber optic sensing, which is a cost-effective method of obtaining real-time, high-resolution, highly accurate temperature, strain, and acoustic/vibration data along the entire downhole fiber, while simultaneously eliminating downhole electronic complexity by shifting all electro-optical system complexity to the interrogator unit(s) located at the topside facility. The interrogator unit(s) is one or more integrated housings inclusive of the launch and receive systems of the fiber optic interrogator system. For the example of a DAS interrogator unit, the launch systems include lasers, pulsers, amplifiers, and shutter sub-systems for generating the probe pulse that enters the sensing fiber, and the receive systems include amplifiers, interferometers, digitizers, and related digital processing systems for receiving and analyzing the Rayleigh backscattered light from the sensing fiber. Example of distributed fiber optic sensing include distributed acoustic sensing (DAS), also referred to as distributed vibration sensing (DVS), which preferentially operates with SMF; distributed Brillouin-frequency sensing for distributed temperature and/or strain sensing and/or pressure sensing (DTS/DSS/DPS) preferentially operates with SMF; and Raman DTS which preferentially operates with MMF. Other distributed fiber optic sensing may include but not be limited to distributed chemical sensing (DCS), distributed electromotive force sensing (DES), and distributed magnetomotive force sensing (DMS).

Distributed fiber optic sensing may operate by continuously sensing along the length of the downhole sensing fiber, and effectively assigning discrete measurements to a position along the length of the fiber via optical time-domain reflectometry (OTDR). That is, by knowing the velocity of light in fiber, and by measuring the time it takes the backscattered light to return to the detector inside the interrogator, it is possible to assign a distance along the fiber. In alternative embodiments, functionally equivalent distributed fiber optic sensing data may be acquired via optical frequency-domain reflectometry (OFDR) techniques.

Discrete, or point, fiber optic sensing is an alternative cost-effective method of obtaining real-time, high-resolution, highly accurate temperature and/or strain (acoustic) data at discrete locations/points along the entire wellbore, while simultaneously eliminating downhole electronic complexity by shifting all electro-optical complexity to the interrogator unit(s) located at the topside facility. Point sensors may include one or more fiber Bragg gratings (FBGs), where the optical waveguide containing the FBG may be modified by a sensor assembly which efficiently transduces a measurement to temperature and/or strain upon at least one FBG. An example of such a sensor assembly is a pressure and temperature gauge, a chemical sensor, and a voltage sensor. FBGs may operate with either SMF or MMF.

The subsea well's downhole sensing fiber connects to the subsea optical distribution system via an optical feedthrough system (OFS) in the subsea Christmas tree (XT) and tubing hanger. The XT may be either a vertical (VXT) or a horizontal XT (HXT) design, or any hybrid or simplified solution where to hang off the downhole completions. The methods and systems described below are agnostic to the use of VXTs or HXTs. In the following description, VXT, HXT, subsea Christmas tree, wet Christmas tree, wet-tree, and subsea tree are all synonymous. The OFS provides optical continuity from transmission fibers in the subsea optical distribution system to the downhole sensing fiber via an assembly of wet- and dry-mate optical connectors and/or splices. When the XT is landed on the tubing hanger, the OFS enables at least one fiber to be optically continuous between the XT's ROV panel and the tubing hanger. Current and future OFS products from TE Connectivity and Teledyne enable at most one, three, or six fibers to be fed through the XT. Fibers may be SMF, MMF, or any combination of SMF and MMF.

From a downhole monitoring system consideration, multiple downhole fibers may increase data acquisition opportunities while simplifying overall downhole monitoring system complexity. For example, one SMF may be used for acquiring DAS and/or DTS, and two SMFs may each or both be used for FBG sensing arrays of pressure and temperature gauges. For intelligent completions, this may potentially eliminate the necessity of electric pressure and temperature gauge arrays, and thus simplify subsea control and power distribution systems. The challenge is that having multiple downhole sensing fibers with their necessity for optical continuity back to the interrogators located at the topside facility, which could place significant complexity, burden, and cost on the subsea optical distribution system. On a per-well basis, the systems and methods described below may maximize the number of downhole sensing fibers while minimizing the number of subsea transmission fibers needed for their continuity from XT to the topside facility.

The subsea optical distribution system provides optical continuity from the downhole sensing fiber to the interrogator located at the topside facility. The optical distribution system may be stand-alone (separated) or integrated with other (e.g., electric and/or hydraulic) utilities of the subsea production system (SPS). This may involve multiple optical flying leads (OFLs), jumper cables, static umbilical lines, dynamic umbilical lines, subsea umbilical termination assemblies (SUTAs), topside umbilical termination assemblies (TUTAs), surface cables between the TUTAs and interrogator(s), optical distribution units (ODUs), and optical distribution through drill centers, manifold centers, or other subsea equipment.

Figure 1B:
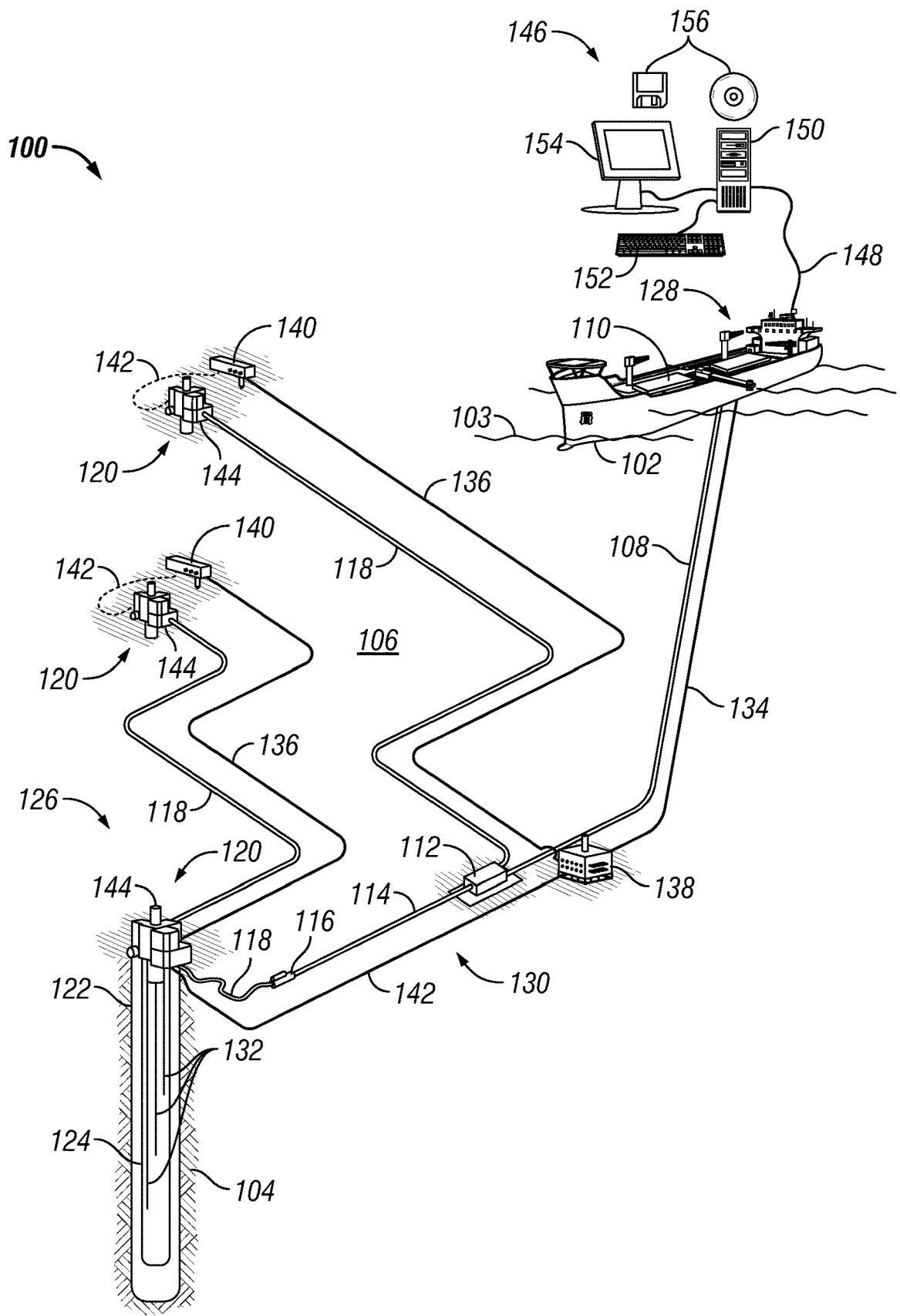

FIGS. 1A and 1B illustrates an example of a well system 100 that may employ the principles of the present disclosure. More particularly, well system 100 may include a floating vessel 102 centered over a subterranean hydrocarbon bearing formation 104 located below a sea floor 106. As illustrated, floating vessel 102 is depicted as an offshore, semi-submersible oil and gas drilling platform, but could alternatively include any other type of floating vessel such as, but not limited to, a drill ship, a pipe-laying ship, a tension-leg platforms (TLPs), a spar platform, a production platform, a floating production, storage, and offloading (FPSO) vessel, a floating production unit (FPU), and/or the like. Additionally, and without loss of generality, the methods and systems described below may also be utilized for subsea tie-backs to a fixed offshore platform, an onshore facility, or a facility on an artificial island. Moreover, the systems and methods of the present disclosure are applicable to onshore reservoirs and related their facilities. A subsea conduit or riser 108 extends from a deck 110 of floating vessel 102 to sea floor 106 and may connect to a production manifold 112. As illustrated, static pipe 114 may run from production manifold 112 to a pipeline end termination 116. Flexible pipe 118 may attach a subsea tree 120 to pipeline end termination 116. In examples, flexible pipe 118 may travers from production manifold 112 and connect directly to subsea tree 120. Additionally, flexible pipe 118 may connect one subsea tree 120 to another subsea tree 120, effectively tying one or more subsea trees 120 together and allow for a single flexible pipe 118 to connect one or more subsea trees 120 to a single production manifold 112.

Subsea tree 120 may cap a wellbore 122 that has been drilled into formation 104. Within wellbore may be a completion system consisting of one or more tubulars 124 that are connected to subsea tree 120. During operations, formation fluids may be produced from formation 104, and flow through one or more tubulars 124 to subsea tree 120. As subsea tree 120 is attached to floating vessel 102, formation fluid may flow from subsea tree 120, through flexible pipe 118, pipeline end termination 116, static pipe 114, production manifold 112, and up through riser 108 to floating vessel 102 for processing, storage, and subsequent offloading or export.

To monitor downhole operations, a Fiber Optic Sensing (FOS) system 126 may be employed from floating vessel 102. FOS 126 system utilizes distributed and/or discrete fiber optic sensing as a cost-effective method of obtaining real-time, high-resolution, highly accurate physical measurements, such as but not limited to temperature, strain, and acoustic measurements along the entire wellbore, while simultaneously eliminating downhole electronic complexity by shifting all electro-optical complexity to the interrogator unit (IU), also called an interrogator, located onboard the floating vessel 102. FOS system 126 may include an interrogator 128, umbilical line 130, and at least one downhole sensing fiber 132. As illustrated, interrogator 128 may be at least partially disposed on floating vessel 102. Interrogator unit 128 may connect to umbilical line 130. Umbilical line 130 may include one or more optical fibers that traverse from a local electronics room (LER) or central control room (CCR) to a topside umbilical termination assembly (TUTA) onboard floating vessel 102. Umbilical line 130 may include a dynamic umbilical line 134, a subsea umbilical termination assembly (SUTA) 140, and a static umbilical line 136. Umbilical line may further include optical flying lead 142 and optical feedthrough system 144. Umbilical line 130 may include one or more fiber optic cables. Each fiber optic cable may include one or more optical fibers.

Figure 3:
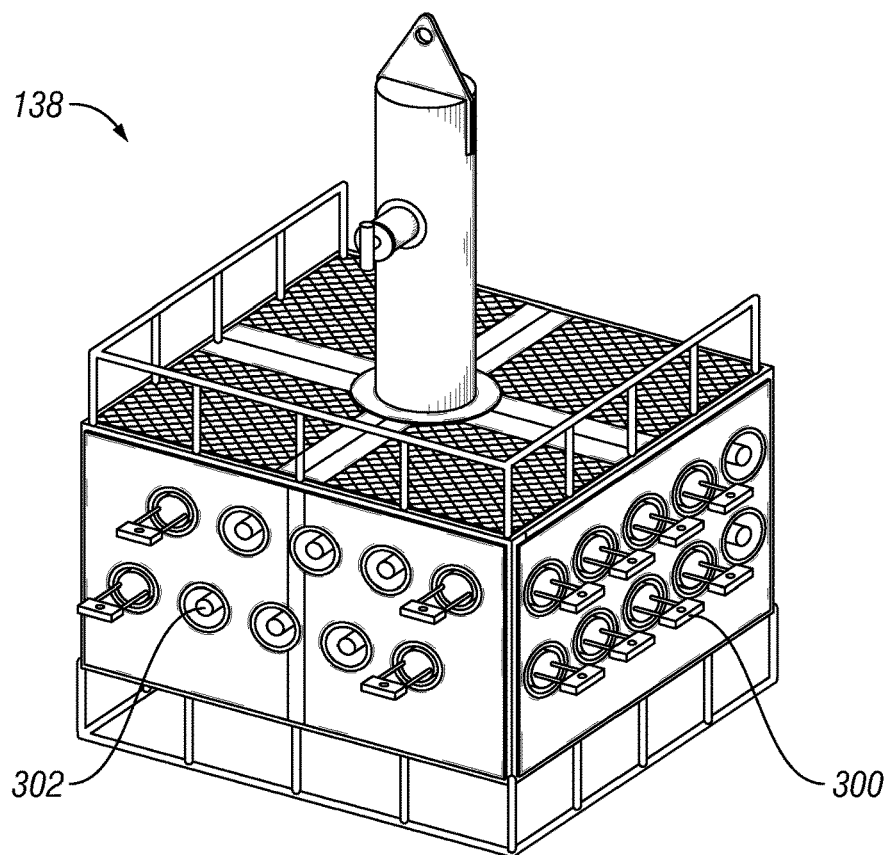
FIG. 3 illustrates an optical distribution unit.

FIG. 3 illustrates an optical distribution unit 138. As illustrated, one of ordinary skill in the art may recognize that optical distribution unit 138 may be constructed to withstand pressures, temperatures, and a subsea environment in which optical distribution unit 138 may operate and function. During operations, a remotely operated vehicle (ROV) (not illustrated) may be deployed from vessel 102 or another vessel with optical distribution unit 138. The ROV may place optical distribution unit 138 in a previously designated area on sea floor 106. Once deployed, optical distribution unit 138 may act as a terminal in which dynamic umbilical line 134 of umbilical line 130 attaches to from vessel 102 (e.g., referring to FIGS. 1A and 1B). One or more ROVs may be utilized to attach dynamic umbilical line 134 and static umbilical line 136 to optical distribution unit 138. Additionally, this procedure, in some operations, may be performed at the surface on vessel 102. In examples, one or more dynamic umbilical lines 134 may attach to one or more input connectors 300. This may allow for one or more static umbilical lines 136 to connect to one or more output connectors 302. Thus, one or more static umbilical lines 136 may allow for a single vessel 102 to service one or more subsea trees 120 that are connected to optical distribution unit 138. To reach subsea trees 120, one or more static umbilical lines 136 traverse to one or more umbilical termination assemblies 140. Additionally, in examples, a flying optical lead 142 (discussed below) may be utilized to connect optical distribution unit 138 to one or more subsea trees 120.

Figure 4:
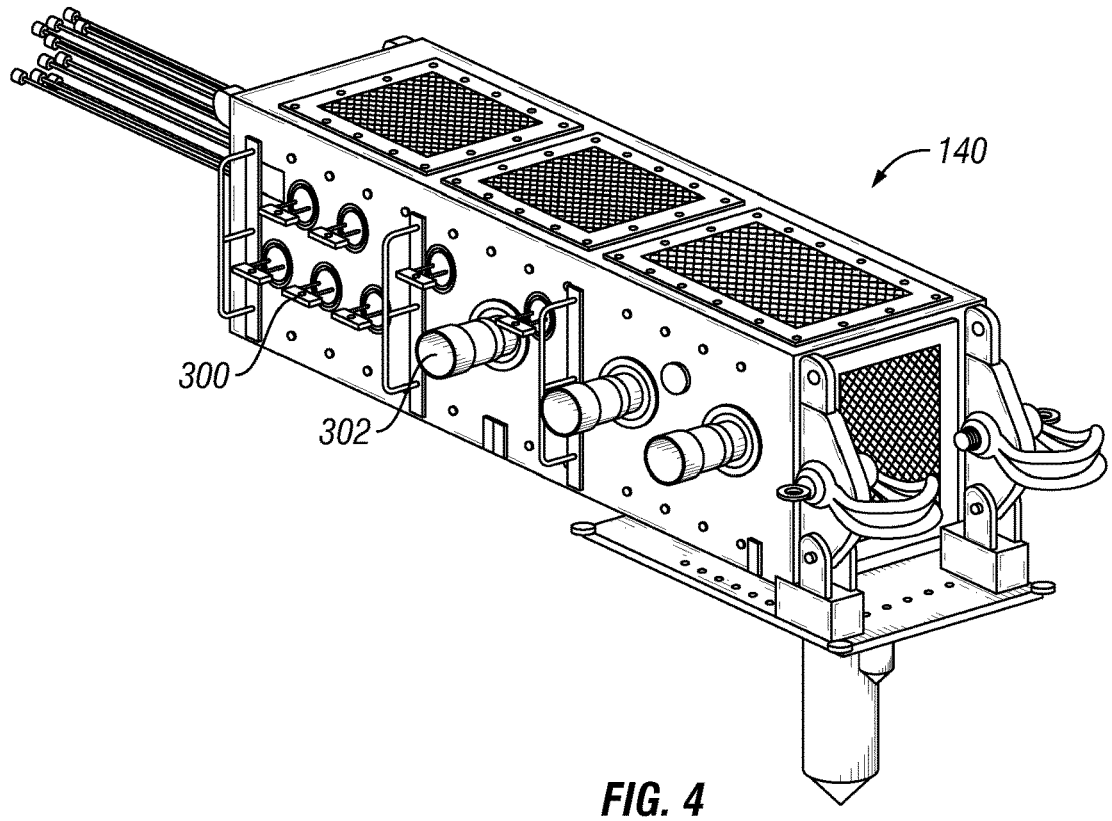
FIG. 4 illustrates an umbilical termination assembly.

FIG. 4 illustrates an umbilical termination assembly 140. As illustrated, one of ordinary skill in the art may recognize that umbilical termination assembly 140 may be constructed to withstand pressures, temperatures, and a subsea environment in which umbilical termination assembly 140 may operate and function. During operations, one or more ROVs (not illustrated) may be deployed from vessel 102 or another vessel with umbilical termination assembly 140. The ROV may place umbilical termination assembly 140 in a previously designated area on sea floor 106. Once deployed, umbilical termination assembly 140 may act as a terminal in which static umbilical line 136 of umbilical line 130 attaches to from optical distribution unit 138 (e.g., referring to FIGS. 1A and 1B). One or more ROVs may be utilized to attach static umbilical line 136 to umbilical termination assembly 140. Additionally, this procedure, in some operations, may be performed at the surface on vessel 102. In examples, one or more dynamic umbilical lines 134 may attach to one or more input connectors 300. From umbilical termination assembly 140, an optical flying lead 142 may connect umbilical termination assembly 140 at one or more output connectors 302 to an optical feedthrough system 144 that is disposed in or is at least a part of subsea tree 120 (e.g., referring to FIGS. 1A and 1B).

Figure 5:
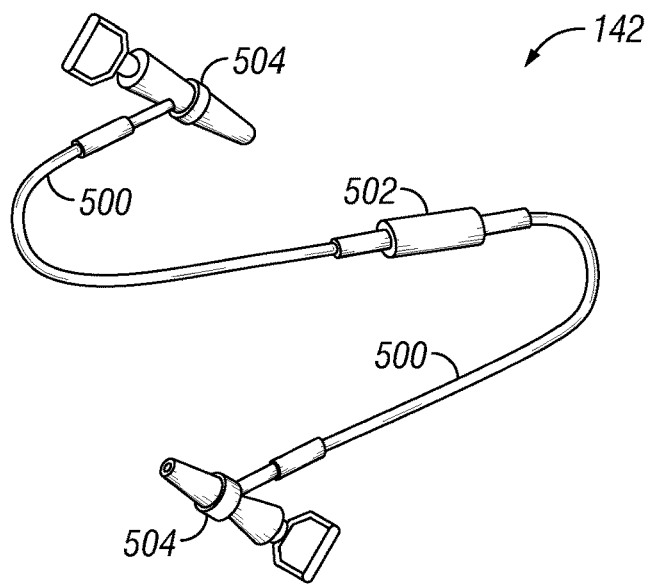
FIG. 5 illustrates an optical flying lead.

FIG. 5 illustrates an optical flying lead. An optical flying lead 142 is a flexible connection that may attach optical distribution unit 138 or umbilical termination assembly 140 or any other suitable location in the optical distribution system to optical feedthrough system 144. As illustrated, optical flying lead 142 includes a flexible hose 500 terminated at both ends with optical wet-mate connectors 504. Flexible hose 500 includes one or more optical fibers that provide optical continuity between the two optical wet-mate connectors 504. Flexible hose 500 may be filled with fluid for pressure balancing in subsea environments. Additionally, an integrated compartment 502 may be disposed at any distance along the flexible hose 500. Integrated compartment 502 may include any number of optical devices, which is discussed in detail below. Integrated compartment 502 may be rated as a one atmosphere (1 atm) pressure cannister qualified for deployment in subsea environments and may contain a nitrogen-purged atmospheric environment. Each optical wet-mate connection 504 is configured to allow for an ROV to attach optical flying lead 142 to optical feedthrough system 144 and optical distribution unit 138 or umbilical termination assembly 140 or any other suitable location in the optical distribution system, as is readily understood to those of ordinary skill in the art.

Figure 6B:
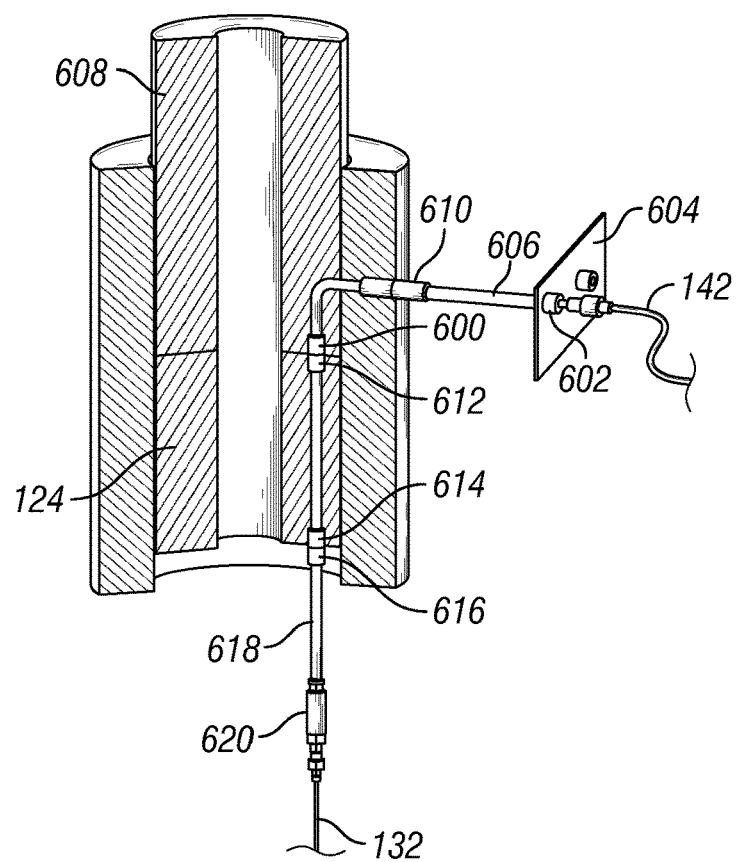
FIG. 6B illustrates a cutaway of at least a part of subsea tree.
Figure 6A:
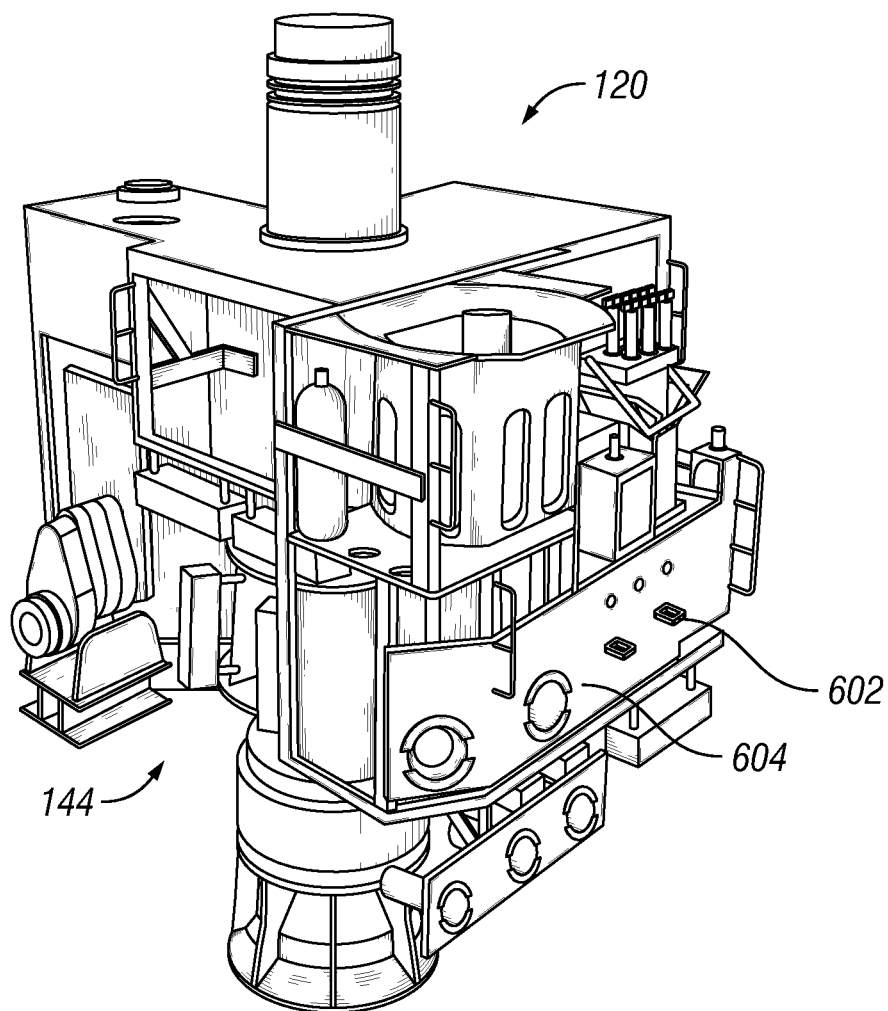
FIG. 6A illustrates an optical feedthrough system.

FIG. 6A illustrates a subsea tree 120 with optical feedthrough system 144. As illustrated, one of ordinary skill in the art may recognize that subsea tree 120 with optical feedthrough system 144 may be constructed to withstand pressures, temperatures, and a subsea environment in which subsea tree 120 and optical feedthrough system 144 may operate and function. During manufacturing of subsea tree 120, optical feedthrough system 144 may be integrated into subsea tree 120 and tubing hanger assemblies. Subsea tree 120 and tubing hanger assemblies each contain an optical wet-mate receptacle 600 (e.g., referring to FIG. 6B) that may be optically coupled when subsea tree 120 and tubing hangers are operationally deployed. During installation operations, the tubing hanger assembly is coupled to the upper completion of wellbore 122 with optical continuity to downhole sensing fiber 132 (e.g., referring to FIGS. 1A and 1B), and landed into wellbore 122 on sea floor 106 (e.g., referring to FIGS. 1A and 2B). Subsea tree 120 is then landed upon the tubing hanger such that subsea tree 120 and tubing hanger are optically coupled via the mated optical wet-mate receptacle 600. One or more ROVs may be utilized to attach optical flying lead 142 (e.g., referring to FIGS. 1A and 1B) to optical wet-mate receptacle 602 located on the ROV panel 604 of subsea tree 120 and optical feedthrough system 144 as well as optical distribution unit 138 or umbilical termination assembly 140. In examples, one or more static umbilical lines 136 may attach directly to subsea trees 120 without optical flying lead 142. Subsea tree 120 and optical feedthrough system 144 may allow for optical flying lead 142 and/or one or more static umbilical lines 136 to connect to one or more downhole sensing fibers 132.

FIG. 6B illustrates optical feedthrough system 144 formed when the subsea tree 120 (e.g., referring to FIG. 6A) has been landed upon a tubing hanger. In examples, optical flying lead 142 may attach optical wet-mate receptacle 602 located on ROV panel 604 of subsea tree 120 (e.g., referring to FIGS. 6A), which is connected to a pressure-compensated flexible hose 606 that terminates with a an optical dry-mate connection 610 at subsea tree block 608. Optical dry-mate connection 600 is connected to the subsea tree's optical wet-mate receptacle 600. During installation operations, subsea tree 120 is landed upon the tubing hanger such that subsea tree's optical wet-mate receptacle 600 optically connects to tubing hanger's optical wet-mate receptacle 612. In some embodiments, the tubing hanger's optical wet-mate receptacle 612 is connected to an optical dry-mate receptacle 614 at the base of the tubing hanger, and optically connected to a pigtail 618 with optical dry-mate receptacle 616. Pigtail 618 is connected to downhole sensing fiber 132 via a splice assembly 620 in the upper completion. In other embodiments, tubing hanger's optical wet-mate receptacle 612 is optically connected to downhole sensing fiber 132 via a splice assembly 620 in the upper completion. Although not illustrated, one or more downhole sensing fibers 132 may be disposed in a fiber optic cable that is optically connected to tubing hanger's optical wet-mate receptacle 612. In examples, an integrated compartment 502 may be installed along flexible hose 606 between subsea tree's ROV panel 604 and the optical dry-mate connection 600 at subsea tree block 608. This integrated compartment may include any number of optical devices, which is discussed in detail below. Integrated compartment 502 may be a one atmosphere (1 atm) pressure cannister rated for deployment in subsea environments and may contain a nitrogen-purged atmospheric environment. As illustrated, and discussed below in further detail, optical feedthrough system 144 allows for optical coupling between optical flying lead 142 and one or more downhole sensing fibers 132 through a single connection. As will be discussed in more detail below, downhole sensing fibers 132 may allow for downhole measurements to be taken within wellbore 122 utilizing principles and function associated with FOS 126.

Referring back to FIGS. 1A and 1B, wellbore 122 extends through the various earth strata toward the subterranean hydrocarbon bearing formation 104 and tubular 124 may be extended within wellbore 122. Even though FIGS. 1A and 1B depict a vertical wellbore 122, it should be understood by those skilled in the art that the methods and systems described are equally well suited for use in horizontal or deviated wellbores. During drilling operations, a drill sting, may include a bottom hole assembly (BHA) that includes a drill bit and a downhole drilling motor, also referred to as a positive displacement motor ("PDM") or "mud motor." During production operations, the completion system represented by tubular 124 may include one or more downhole sensing fibers 132 of a FOS system 126.

Downhole sensing fiber 132 may be permanently deployed in a wellbore via single- or dual-trip completion systems, behind casing, on tubing, or in pumped down installations. FIGS. 2A-2C illustrate examples of different types of deployment of downhole sensing fiber 132 in wellbore 122 (e.g., referring to FIGS. 1A and 1B). As illustrated in FIG. 2A, wellbore 122 deployed in formation 104 may include surface casing 200 in which production casing 202 may be deployed. Additionally, production tubing 204 may be deployed within production casing 202. In this example, downhole sensing fiber 132 may be permanently deployed in a completion system. In examples, downhole sensing fiber 132 is attached to the outside of production tubing 204 by one or more cross-coupling protectors 210. Without limitation, cross-coupling protectors 210 may be evenly spaced and may be disposed on every other joint of production tubing 204. Further illustrated, downhole sensing fiber 132 may be coupled to a fiber connection 206. Without limitation, fiber connection 206 may attach downhole sensing fiber 132 to optical feedthrough system 144, and/or umbilical line 130 (e.g., referring to FIGS. 1A and 1B) in the manner, systems, and/or methods described above. In examples, downhole sensing fiber 132 may further be optically connected to umbilical line 130 through optical flying lead 142 (e.g., referring to FIGS. 1A and 1B). Fiber connection 206 may operate as an optical feedthrough system 144 (itself comprising a series of wet- and dry-mate optical connectors and splices) in the wellhead that optically connects downhole sensing fiber 132 from the tubing hanger to umbilical line 130 on the subsea tree's ROV panel 604 (e.g., referring to FIGS. 6A and 6B). Umbilical line 130 may include to an optical flying lead 142 and may further include an optical distribution system(s) 138, umbilical termination unit(s) 140, and transmission fibers encapsulated in flying optical leads 142, flow lines, rigid risers, flexible risers, and/or one or more static and/or dynamic umbilical lines. This may allow for umbilical line 130 to connect and disconnect from downhole sensing fiber 132 while preserving optical continuity between the umbilical line 130 and the downhole sensing fiber 132.

FIG. 2B illustrates an example of permanent deployment of downhole sensing fiber 132. As illustrated in wellbore 122 deployed in formation 104 may include surface casing 200 in which production casing 202 may be deployed. Additionally, production tubing 204 may be deployed within production casing 202. In examples, downhole sensing fiber 132 is attached to the outside of production casing 202 by one or more cross-coupling protectors 210. Without limitation, cross-coupling protectors 210 may be evenly spaced and may be disposed on every other joint of production tubing 204. downhole sensing fiber 132

FIG. 2C illustrates an example of a pump-down fiber operation in which downhole sensing fiber 132 may be deployed either permanently or temporarily. As illustrated in FIG. 2C, wellbore 122 deployed in formation 104 may include surface casing 200 in which production casing 202 may be deployed. Additionally, capillary tubing 212 may be deployed within the production casing 202. In this example, downhole sensing fiber 132 may be permanently or temporarily deployed via a pumping operation into the capillary tube.

Referring back to FIGS. 1A and 1B, interrogator unit 128 may be connected to an information handling system 146 through connection 148, which may be wired and/or wireless. It should be noted that both information handling system 146 and interrogator unit 128 are disposed on floating vessel 102. Both systems and methods of the present disclosure may be implemented, at least in part, with information handling system 146. Information handling system 146 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 146 may be a processing unit 150, a network storage device, or any other suitable device and may vary in size, shape, performance, functionality, and price. Information handling system 146 may include random access memory (RAM), one or more processing resources such as a central processing unit (CPU) or hardware or software control logic, ROM, and/or other types of nonvolatile memory. Additional components of the information handling system 146 may include one or more disk drives, one or more network ports for communication with external devices as well as an input device 152 (e.g., keyboard, mouse, etc.) and video display 154. Information handling system 146 may also include one or more buses operable to transmit communications between the various hardware components.

Alternatively, systems and methods of the present disclosure may be implemented, at least in part, with non-transitory computer-readable media 156. Non-transitory computer-readable media 156 may include any instrumentality or aggregation of instrumentalities that may retain data and/or instructions for a period of time. Non-transitory computer-readable media 156 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations in a subsea environment may present optical challenges for a DAS based FOS system 126. For example, in a DAS system, a maximum pulse power that may be used is approximately inversely proportional to fiber length due to optical non-linearities in the fiber. Therefore, the quality of the overall signal is poorer with a longer fiber than a shorter fiber. This may impact any FOS system 126 that may utilize DAS, since the distal end of the downhole sensing fiber 132 may include an interval of interest (i.e., the reservoir) in which the downhole sensing fiber 132 may be deployed. The interval of interest may include wellbore 122 and formation 104. For pulsed DAS systems, in FOS system 126, such as the one exemplified in FIG. 7, an additional challenge is the drop-in signal to noise ratio (SNR) and spectral bandwidth associated with the decrease in the number of light pulses that may be launched into the fiber per second (i.e., DAS pulse repetition rate) when interrogating fibers with overall lengths exceeding 10 km. As such, utilizing DAS system in FOS system 126 in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second.

Figure 7:
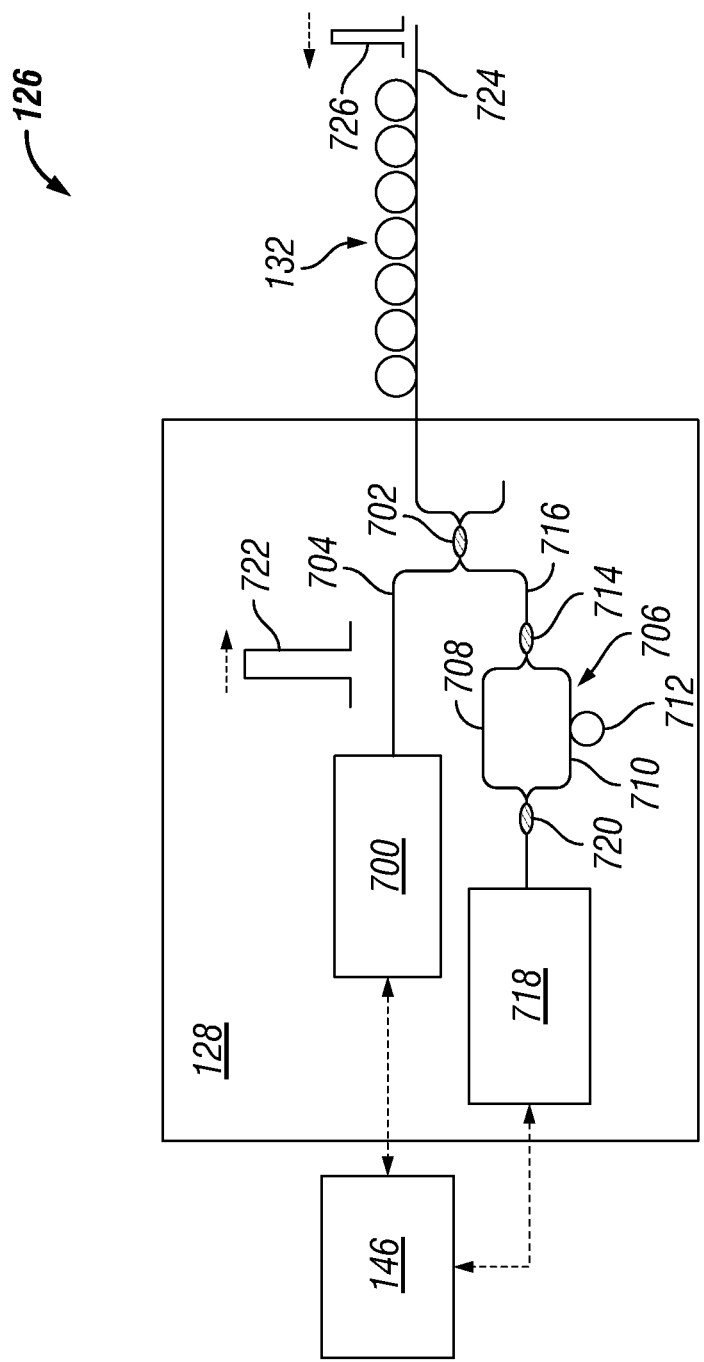
FIG. 7 illustrates an example of a FOS system.

FIG. 7 illustrates an example of DAS system for FOS 126. The DAS system may include information handling system 146 that is communicatively coupled to interrogator unit 128. Without limitation, DAS system may include a coherent Rayleigh scattering system with a compensating interferometer. In examples, the DAS system may be used for phase-sensitive sensing of events in a wellbore using measurements of coherent Rayleigh backscatter and/or may interrogate a downhole sensing fiber containing an array of partial reflectors, for example, fiber Bragg gratings.

As illustrated in FIG. 7, interrogator unit 128 may include a pulse generator 700 coupled to a first coupler 702 using an optical fiber 704. Pulse generator 700 may be a laser, or a laser connected to at least one amplitude modulator, or a laser connected to at least one switching amplifier, i.e., semiconductor optical amplifier (SOA). First coupler 702 may be a traditional fused type fiber optic splitter, a circulator, a PLC fiber optic splitter, or any other type of splitter known to those with ordinary skill in the art. Pulse generator 700 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

FOS system 126, which is a DAS system, may include an interferometer 706. Without limitations, interferometer 706 may include a Mach-Zehnder interferometer. For example, a Michelson interferometer or any other type of interferometer 706 may also be used without departing from the scope of the present disclosure. Interferometer 706 may include a top interferometer arm 708, a bottom interferometer arm 710, and a gauge 712 positioned on bottom interferometer arm 710. Interferometer 706 may be coupled to first coupler 702 through a second coupler 714 and an optical fiber 716. Interferometer 706 further may be coupled to a photodetector assembly 718 of the DAS system through a third coupler 720 opposite second coupler 714. Second coupler 714 and third coupler 720 may be a traditional fused type fiber optic splitter, a PLC fiber optic splitter, or any other type of optical splitter known to those with ordinary skill in the art. Photodetector assembly 718 may include associated optics and signal processing electronics (not shown). Photodetector assembly 718 may be a semiconductor electronic device that uses the photoelectric effect to convert light to electricity. Photodetector assembly 718 may be an avalanche photodiode or a pin photodiode but is not intended to be limited to such.

When operating FOS system 126, pulse generator 700 may generate a first optical pulse 722 which is transmitted through optical fiber 704 to first coupler 702. First coupler 702 may direct first optical pulse 722 through a sensing fiber 724. It should be noted that sensing fiber 724 may be disposed in umbilical line 130 and is at least a part of downhole sensing fiber 132 (e.g., referring to FIGS. 1A and 1B). As illustrated, sensing fiber 724 may be coupled to first coupler 702. As first optical pulse 722 travels through sensing fiber 724, imperfections in sensing fiber 724 may cause a portion of the light to be backscattered along fiber optical cable 724 due to Rayleigh scattering. In other embodiments, the sensing fiber 724 may be enhanced (or engineered) to yield a higher-than-Rayleigh backscatter coefficient. Scattered light according to Rayleigh scattering is returned from every point along sensing fiber 724 along the length of sensing fiber 724 and is shown as backscattered light 726 in FIG. 7. This backscatter effect may be referred to as Rayleigh backscatter. Density fluctuations in sensing fiber 724 may give rise to energy loss due to the scattered light, $\alpha_{scat}$, with the following coefficient:

$$\alpha_{scat} = \frac{8\pi^3}{3\lambda^4} n^8 p^2 k T_f \beta \quad (1)$$

where n is the refraction index, p is the photoelastic coefficient of sensing fiber 724, k is the Boltzmann constant, and β is the isothermal compressibility. $T_f$ is a fictive temperature, representing the temperature at which the density fluctuations are "frozen" in the material. Fiber optical cable 724 may be terminated with a low reflection device (not shown). In examples, the low reflection device (not shown) may be a fiber coiled and tightly bent to violate Snell's law of total internal reflection such that all the remaining energy is sent out of sensing fiber 724.

Backscattered light 726 may travel back through sensing fiber 724, until it reaches second coupler 714. First coupler 702 may be coupled to second coupler 714 on one side by optical fiber 716 such that backscattered light 726 may pass from first coupler 702 to second coupler 714 through optical fiber 716. Second coupler 714 may split backscattered light 726 based on the number of interferometer arms so that one portion of any backscattered light 726 passing through interferometer 706 travels through top interferometer arm 708 and another portion travels through bottom interferometer arm 710. Therefore, second coupler 714 may split the backscattered light from optical fiber 716 into a first backscattered pulse and a second backscattered pulse. The first backscattered pulse may be sent into top interferometer arm 708. The second backscattered pulse may be sent into bottom interferometer arm 710. These two portions may be re-combined at third coupler 720, after they have exited interferometer 706, to form an interferometric signal.

Interferometer 706 may facilitate the generation of the interferometric signal through the relative phase shift variations between the light pulses in top interferometer arm 708 and bottom interferometer arm 710. Specifically, gauge 712 may cause the length of bottom interferometer arm 710 to be longer than the length of top interferometer arm 708. With different lengths between the two arms of interferometer 706, the interferometric signal may include backscattered light from two positions along sensing fiber 724 such that a phase shift of backscattered light between the two different points along sensing fiber 724 may be identified in the interferometric signal. The distance between those points L may be half the length of the gauge 712 in the case of a Mach-Zehnder configuration, or equal to the gauge length in a Michelson interferometer configuration.

While FOS system 126 is running, the interferometric signal will typically vary over time. The variations in the interferometric signal may identify strains in sensing fiber 724 that may be caused, for example, by seismic energy. By using the time of flight for first optical pulse 722, the location of the strain along sensing fiber 724 and the time at which it occurred may be determined. If sensing fiber 724 is positioned within a wellbore, the locations of the strains in sensing 724 may be correlated with depths in the formation in order to associate the seismic energy with locations in the formation and wellbore.

To facilitate the identification of strains in sensing fiber 724, the interferometric signal may reach photodetector assembly 718, where it may be converted to an electrical signal. The photodetector assembly may provide an electric signal proportional to the square of the sum of the two electric fields from the two arms of the interferometer. This signal is proportional to:

$$P(t)=P1+P2+2*\sqrt{(P1P2)}\cos(\phi 1-\phi 2) \quad (2)$$

where $P_n$ is the power incident to the photodetector from a particular arm (1 or 2) and $\phi_n$ is the phase of the light from the particular arm of the interferometer. Photodetector assembly 718 may transmit the electrical signal to information handling system 146, which may process the electrical signal to identify strains within sensing fiber 724 and/or convey the data to a display and/or store it in computer-readable media. Photodetector assembly 718 and information handling system 146 may be communicatively and/or mechanically coupled. Information handling system 146 may also be communicatively or mechanically coupled to pulse generator 700.

Modifications, additions, or omissions may be made to FIG. 7 without departing from the scope of the present disclosure. For example, FIG. 7 shows a particular configuration of components of a DAS system, which is a FOS system 126, operating via optical time-domain reflectometry (OTDR). However, any suitable configurations of components may be used, including such that the DAS system may be operated via optical frequency-domain interferometry (OFDR). As another example, pulse generator 700 may generate a multitude of coherent light pulses, optical pulse 722, operating at distinct frequencies that are launched into the sensing fiber 724 either simultaneously or in a staggered fashion. For example, the photo detector assembly is expanded to feature a dedicated photodetector assembly for each light pulse frequency. In examples, a compensating interferometer may be placed in the launch path (i.e., prior to traveling down sensing fiber 724) of the interrogating pulse to generate a pair of pulses that travel down sensing fiber 724. In examples, interferometer 706 may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 712 of FIG. 7) may be used to delay one of the pulses. To accommodate phase detection of backscattered light using FOS system 126, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

In examples, the DAS system, which is a FOS system 126, may generate interferometric signals for analysis by the information handling system 146 without the use of a physical interferometer. For instance, the DAS system may direct backscattered light to photodetector assembly 718 without first passing it through any interferometer, such as interferometer 706 of FIG. 7. Alternatively, the backscattered light from the interrogation pulse may be mixed with the light from the laser originally providing the interrogation pulse. Thus, the light from the laser, the interrogation pulse, and the backscattered signal may all be collected by photodetector assembly 718 and then analyzed by information handling system 146. The light from each of these sources may be at the same optical frequency in a homodyne phase demodulation system or may be different optical frequencies in a heterodyne phase demodulator. This method of mixing the backscattered light with a local oscillator allows measuring the phase of the backscattered light along the fiber relative to a reference light source.

Figure 8:
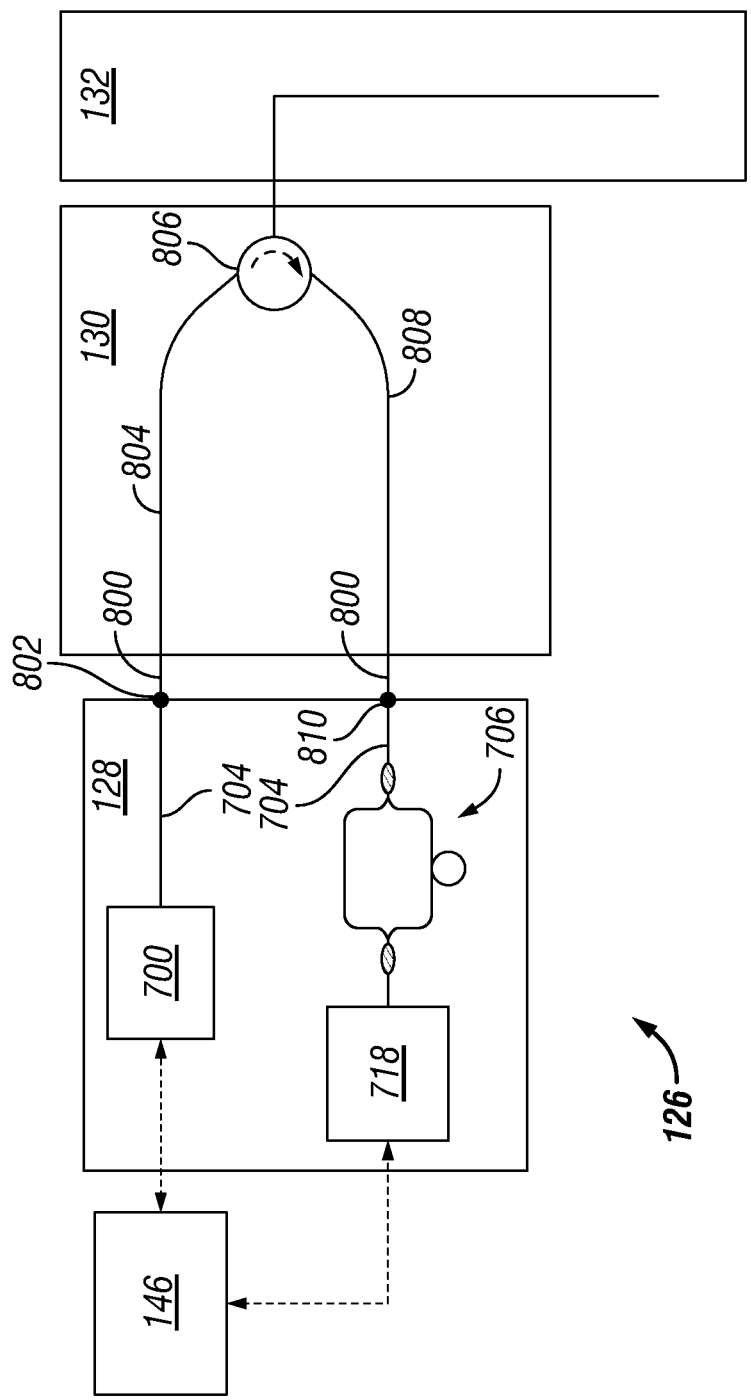
FIG. 8 illustrate an example of a FOS system with lead lines.

FIG. 8 illustrates an example of DAS system, which is FOCS system 126, which may be utilized to overcome challenges presented by a subsea environment. FOCS system 126 may comprise interrogator unit 128, umbilical line 130, and downhole sensing fiber 132. As illustrated, interrogator unit 128 may comprise pulse generator 700 and photodetector assembly 718, both of which may be communicatively coupled to information handling system 146. Additionally, interferometers 706 may be placed within interrogator unit 128 and operate and/or function as described above. FIG. 8 illustrates an example of FOCS system 126 in which lead lines 800 may be used. As illustrated, an optical fiber 704 may attach pulse generator 700 to an output 802, which may be a fiber optic connector. Umbilical line 130 may attach to output 802 with a first fiber optic cable 804. First fiber optic cable 804 may traverse the length of umbilical line 130 to a circulator 806. Circulators are passive optical devices. Passive optical devices are devices that are optically connected to a fiber optic cable to receive and direct light (e.g., light pulses) along the fiber optic cable or to at least another fiber optic cable connected to the passive optical device. Although circulators are described herein for this disclosure, any suitable passive optical device may be utilized in place of the circulator. Examples of suitable passive optical devices comprise a fused type fiber optic splitter, a Planar Waveguide Circuit (PLC) fiber optic splitter, or any other type of optical splitter. Circulator 806 may connect first fiber optic cable 804 to second fiber optic cable 808. In examples, circulator 806 functions to steer light unidirectionally between one or more input and outputs of circulator 806. Without limitation, circulators 806 are passive three-port devices wherein light from a first port is split internally into two independent polarization states and wherein these two polarization states are made to propagate two different paths inside circulator 806. These two independent paths allow one or both independent light beams to be rotated in polarization state via the Faraday effect in optical media. Polarization rotation of the light propagating through free space optical elements within the circulator thus allows the total optical power of the two independent beams to uniquely emerge together with the same phase relationship from a second port of circulator 806.

Conversely, if any light enters the second port of remote circulator 806 in the reverse direction, the internal free space optical elements within remote circulator 806 may operate identically on the reverse direction light to split it into two polarizations states. After appropriate rotation of polarization states, these reverse in direction polarized light beams, are recombined, as in the forward propagation case, and emerge uniquely from a third port of remote circulator 806 with the same phase relationship and optical power as they had before entering remote circulator 806. Additionally, as discussed below, remote circulator 806 may act as a gateway, which may only allow chosen wavelengths of light to pass through remote circulator 806 and pass to downhole sensing fiber 132. Second fiber optic cable 808 may attach umbilical line 130 to input 810. Input 810 may be a fiber optic connector which may allow backscatter light to pass into interrogator unit 128 to interferometer 706 Interferometer 706 may operate and function as described above and further pass back scatter light to photodetector assembly 718.

Figure 9:
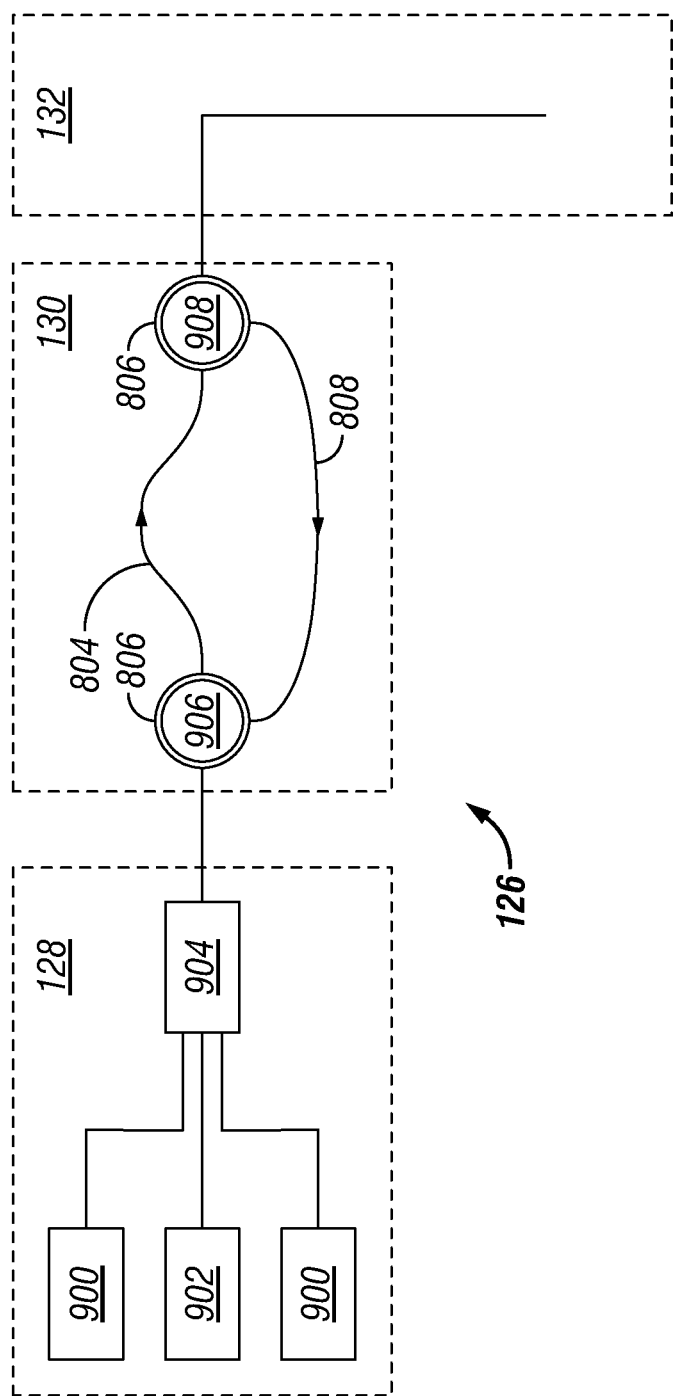
FIG. 9 illustrates a schematic of another example FOS system.

FIG. 9 illustrates another example of FOCS system 126, which is a DAS system. As illustrated, interrogator unit 128 may comprise one or more DAS interrogator units 900, each emitting coherent light pulses at a distinct optical wavelength, and a Raman Pump 902 connected to a wavelength division multiplexer 904 (WDM) with fiber stretcher(s). In examples, any type of optical amplifier may be utilized in place of Raman Pump 902. Without limitation, WDM 904 may comprise a multiplexer assembly that multiplexes the light received from the one or more DAS interrogator units 900 and a Raman Pump 902 onto a single optical fiber and a demultiplexer assembly that separates the multi-wavelength backscattered light into its individual frequency components and redirects each single wavelength backscattered light stream back to the corresponding DAS interrogator unit 900. However, although WDM's are described above and below, WDM's may be substituted for with a diffraction grating filter (DGF), a holographic diffraction grating filter, an optical Fourier filter (i.e., tunable or static), a nonlinear frequency-division multiplexer (NFDM), an arrayed waveguide grating (AWG), and/or a quantum-memory wavelength-division multiplexer (QWDM). Additionally, it should be noted that WDMs may operate and function to combine and/or split light (e.g., signals) that pass through the WDM or equivalent. Furthermore, WDMs may enable time-division multiplexed (TDM) or frequency-divisional multiplexed (FDM) interrogation systems.

In an example, WDM 904 may utilize an optical add-drop multiplexer to enable multiplexing the light received from the one or more DAS interrogator units 900 and a Raman Pump 902 and demultiplexing the multi-wavelength backscattered light received from a single fiber. WDM 904 may also comprise circuitry to optically amplify the multi-frequency light prior to launching it into the single optical fiber and/or optical circuitry to optically amplify the multi-frequency backscattered light returning from the single optical fiber, thereby compensating for optical losses introduced during optical (de-)multiplexing. Raman Pump 902 may be a co- and/or counter-propagating optical pump based on stimulated Raman scattering, to feed energy from a pump signal to a main pulse from one or more DAS interrogator units 900 as the main pulse propagates down one or more fiber optic cables. This may conservatively yield a distributed 3 dB improvement in SNR at 25 km tie-back distances, but as much as a distributed 6 dB gain at 50 km. Moreover, Raman Pump 902 may comprise of cascading Raman amplifiers assembled to yield a distributed gain profile along the transmission fiber(s).

As illustrated, Raman Pump 902 is located in interrogator unit 128 for co-propagation. In another example, Raman Pump 902 may be located topside after one or more circulators 806 either in line with first fiber optic cable 804 (co-propagation mode) and/or in line with second fiber optic cable 808 (counter-propagation). In another example, Raman Pump 902 is marinized and located after distal circulator 908 configured either for co-propagation or counter-propagation. In still another example, the light emitted by the Raman Pump 902 is remotely reflected by using a wavelength-selective filter beyond a circulator 806 in order to provide amplification in the return path using a Raman Pump 902 in any of the topside configurations outlined above. The wavelength-selective filter beyond circulator 806 may also be used to ensure the high optical power of the Raman Pump 902 is reflected from low power optical components, such as the optical wet-mate connectors in the optical feedthrough system 144 (e.g., referring to FIGS. 6A and 6B).

Further illustrated in FIG. 9, WDM 904 with fiber stretcher may attach proximal circulator 906 to umbilical line 130. Umbilical line 130 may include one or more remote circulators 806, a first fiber optic cable 804, and a second fiber optic cable 808. As illustrated, a first fiber optic cable 804 and a second fiber optic cable 808 may be separate and individual fiber optic cables that may be attached at each end to one or more remote circulators 806. In examples, first fiber optic cable 804 and second fiber optic cable 808 may be different lengths or the same length and each may be an ultra-low loss transmission fiber that may have a higher power handling capability before non-literarily. This may enable a higher gain, co-propagation Raman amplification from interrogator unit 128.

Deploying first fiber optic cable 804 and as second fiber optic cable 808 from floating vessel 102 (e.g., referring to FIGS. 1A and 1B) to a subsea environment to a distal-end passive optical circulator arrangement, enables downhole sensing fiber 132, which is a sensing fiber, to be below a remote circulator 806 (e.g., well-only) that may be at the distal end of FOS system 126, which is a DAS system. This may allow for higher (e.g., 2-3×) DAS pulse repetition rates, and allow for the optical receivers to be adjusted such that their dynamic range is optimized for downhole sensing fiber 132. Depending on the tie-back distance between OFL and interrogator, this may yield 3 to dB improvement in SNR. Additionally, downhole sensing fiber 132 may be an enhanced backscatter sensing fiber that has higher-than-Rayleigh scattering coefficient which may result in a ten to one hundred times improvement in backscatter, which may yield a 10 dB to 20 dB improvement in SNR. In examples, remote circulators 806 may further be categorized as a proximal circulator 906 and a distal circulator 908. Proximal circulator 906 is located closer to interrogator unit 128 and may be located on floating vessel 102 or within umbilical line 130. Distal circulator 908 may be further away from interrogator unit 128 than proximal circulator 906 and may be located in umbilical line 130, in an optical flying lead 142, in an optical feedthrough system 144, or within wellbore 122 (e.g., referring to FIGS. 1A and 1B). As discussed above, a configuration illustrated in FIG. 8 may not utilize a proximal circulator 906 with lead lines 800.

Figure 10:
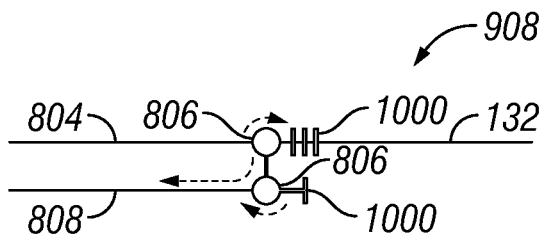
FIG. 10 illustrates an example of a remote circulator arrangement.

FIG. 10 illustrates another example of distal circulator 908, which may include two remote circulators 806. As illustrated, each remote circulator 806 may function and operate to avoid overlap, at interrogator unit 128, of backscattered light from two different pulses. For example, during operations, light at a first wavelength may travel from interrogator unit 128 down first fiber optic cable 804 to a remote circulator 806. As the light passes through remote circulator 806 the light may encounter a Fiber Bragg Grating 1000. In examples, Fiber Bragg Grating 1000 may be referred to as a filter mirror that may be a wavelength specific high reflectivity filter mirror or filter reflector that may operate and function to recirculate unused light back through the optical circuit for "double-pass" co- and/or counter-propagating Raman amplification of the DAS signal. In examples, Fiber Bragg Grating 1000 may be referred to as an optically reflective element. In examples, this wavelength specific "Raman light" mirror may be a dichroic thin film interference filter, Fiber Bragg Grating 1000, or any other suitable optical filter that passes only the 1550 nm forward propagating DAS interrogation pulse light while simultaneously reflecting most of the residual Raman Pump light.

Without limitation, Fiber Bragg Grating 1000 may be set-up, fabricated, altered, and/or the like to allow only certain selected wavelengths of light to pass. All other wavelengths may be reflected back to the second remote circulator, which may send the reflected wavelengths of light along second fiber optic cable 808 back to interrogator unit 128. This may allow Fiber Bragg Grating 1000 to split DAS system 126 (e.g., referring to FIG. 9) into two regions. A first region may be identified as the devices and components before Fiber Bragg Grating 1000 and the second region may be identified as downhole sensing fiber 132 and any other devices after Fiber Bragg Grating 1000.

Splitting the DAS system, which is a FOS system 126, (e.g., referring to FIG. 9) into two separate regions may allow interrogator unit 128 (e.g., referring to FIGS. 1A and 1B) to pump specifically for an identified region. For example, the disclosed system of FIG. 9 may include one or more Raman pumps 902, as described above, placed in interrogator unit 128 or after proximal circulator 906 at the topside either in line with first fiber optic cable 804 or second fiber optic cable 808 that may emit a wavelength of light that may travel only to a first region and be reflected by Fiber Bragg Grating 1000. A second Raman pump may emit a wavelength of light that may travel to the second region by passing through Fiber Bragg Grating 1000. Additionally, both the first Raman pump and second Raman pump may transmit at the same time. Without limitation, there may be any number of Raman pumps and any number of Fiber Bragg Gratings 1000 which may be used to control what wavelength of light travels through downhole sensing fiber 132. FIG. 10 also illustrates Fiber Bragg Gratings 1000 operating in conjunction with any remote circulator 806, whether it is a distal circulator 908 or a proximal circulator 906. Additionally, as discussed below, Fiber Bragg Gratings 1000 may be attached at the distal end of downhole fiber 218 and act as a mirror. Other alterations to DAS system 126 (e.g., referring to FIG. 9) may be undertaken to improve the overall performance of DAS system 126. For example, the lengths of first fiber optic cable 804 and second fiber optic cable 808 may be selected to increase pulse repetition rate (expressed in terms of the time interval between pulses $t_{rep}$).

Figure 11:
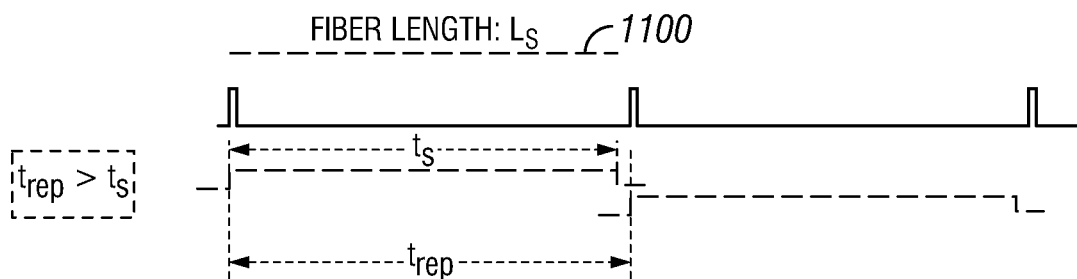
FIG. 11 illustrates a graph for determining time for a light pulse to travel in a fiber optic cable.

FIG. 11 illustrates an example of fiber optic cable 1100 in which no remote circulator 806 may be used. As illustrated, the entire fiber optic cable 1100 is a sensor and the pulse interval must be greater than the time for the pulse of light to travel to the end of fiber optic cable 1100 and its backscatter to travel back to interrogator unit 128 (e.g., referring to FIGS. 1A and 1B). This is so, since in the DAS system, which is a FOS system 126, at no point in time, backscatter from more than one location along sensing fiber (i.e., downhole sensing fiber 132) may be received. Therefore, the pulse interval $t_{rep}$ must be greater than twice the time light takes to travel "one-way" down the fiber. Let $t_s$ be the "two-way" time for light to travel to the end of fiber optic cable 1100 and back, which may be written as $t_{rep} > t_s$.

Figure 12:
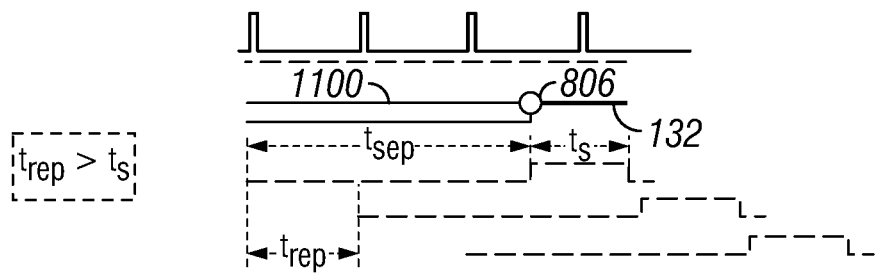
FIG. 12 illustrates another graph for determining time for a light pulse to travel in a fiber optic cable.

FIG. 12 illustrates an example of fiber optic cable 1100 with a remote circulator 806 using the configuration shown in FIG. 9. When a remote circulator 806 is used, only the light traveling in fiber optic cable 600 that is allowed to go beyond remote circulator 806 and to downhole sensing fiber 132 may be returned to interrogator unit 128 (e.g., referring to FIGS. 1A and 1B), thus, the interval between pulses is dictated only by the length of the sensing portion, downhole sensing fiber 132 of fiber optic cable 1100. It should be noted that in terms of pulse timing what matters is the two-way travel time of the light pulse "to" and "from" the sensing portion, downhole sensing fiber 132. Therefore, the first fiber optic cable 804 or second fiber optic cable 808 "to" and "from" remote circulator 806 may be longer than the other, as discussed above.

Figure 13:
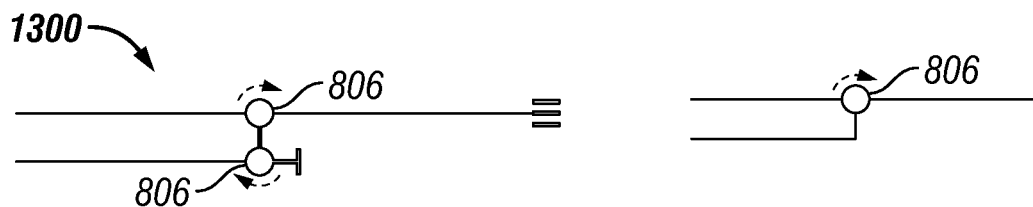
FIG. 13 illustrates an example of a remote circulator arrangement.

FIG. 13 illustrates an example remote circulator arrangement 1300 which may allow, as described above, configurations that use more than one remote circulator 806 close together at the remote location. Although remote circulator arrangement 1300 may have any number of remote circulators 806, remote circulator arrangement 1300 may be illustrated as a single remote circulator 806.

Figure 14:
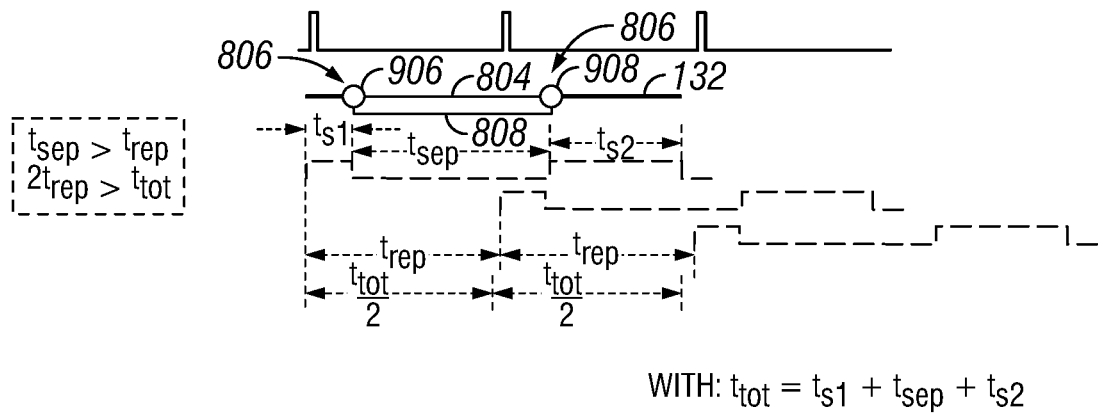
FIG. 14 illustrates another graph for determining time for a light pulse to travel in a fiber optic cable.
Figure 15A:
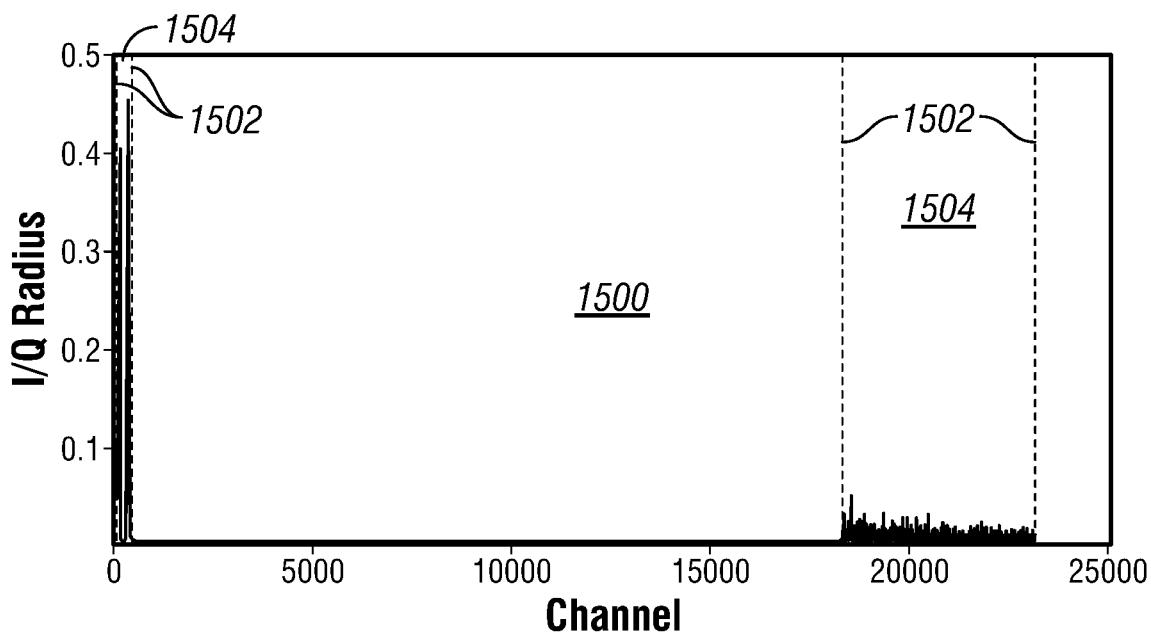
FIG. 15A illustrates a graph of sensing regions in the DAS system.
Figure 15B:
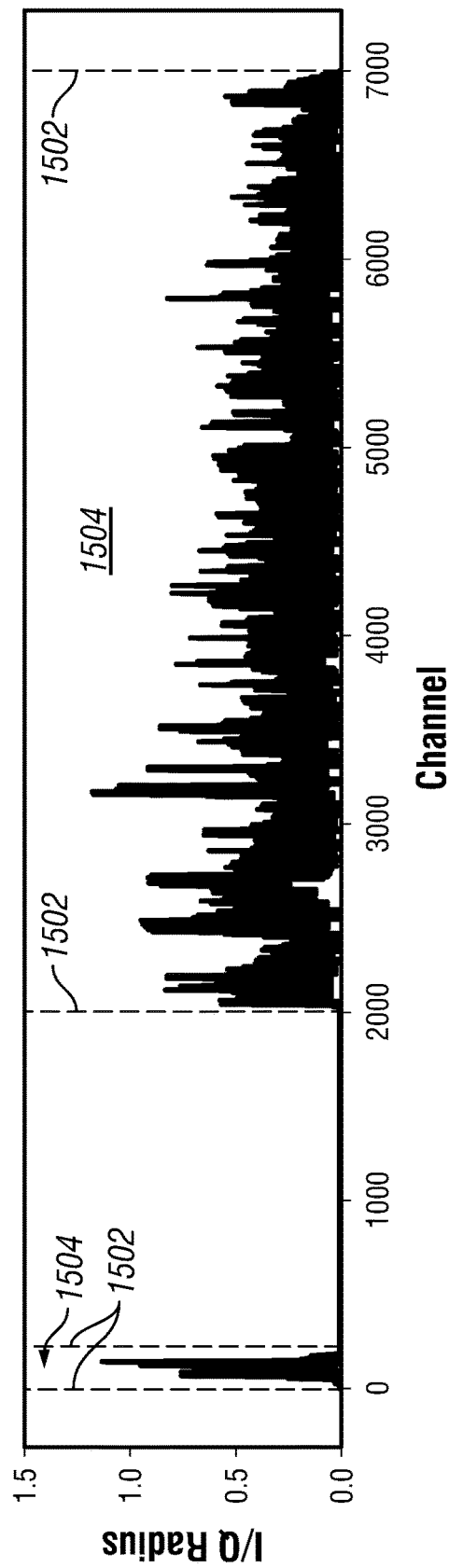
FIG. 15B illustrates a graph with an active proximal circulator using an optimized FOS sampling frequency of 12.5 kHz.
Figure 15C:
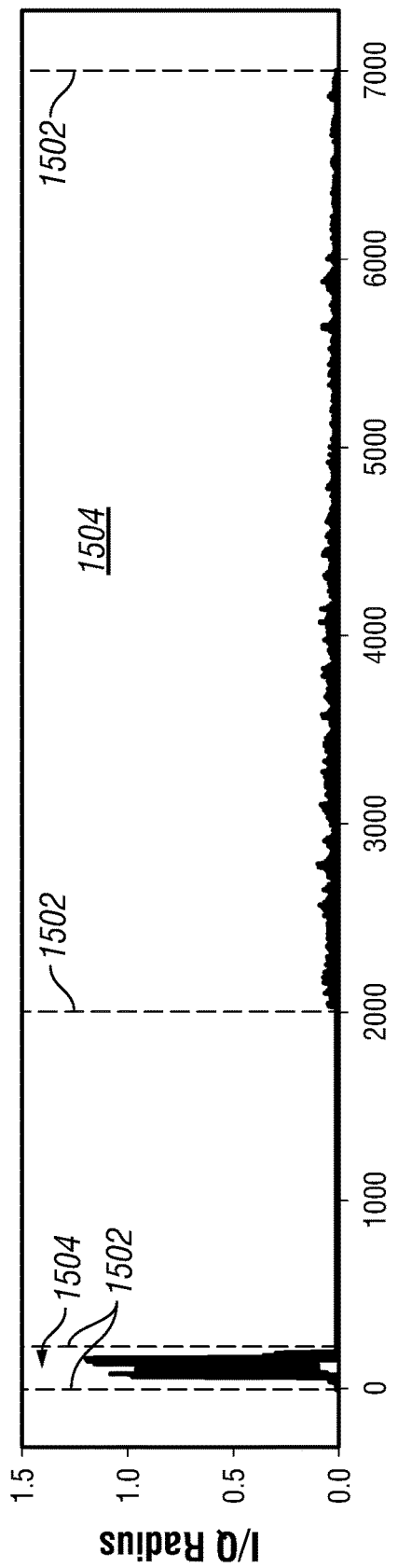
FIG. 15C illustrates a graph with a passive proximal circulator using an optimized FOS sampling frequency of 12.5 kHz.
Figure 16:
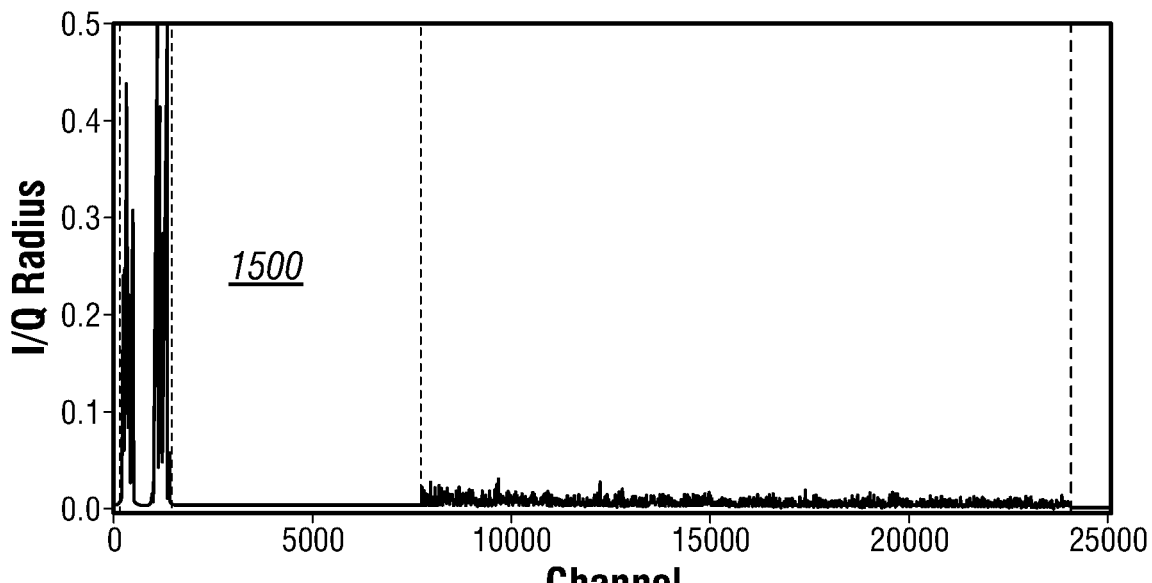
FIG. 16 illustrates a graph of optimized sampling frequencies in the FOS system.

FIG. 14 illustrates an example first fiber optic cable 804 and second fiber optic cable 808 attached to a remote circulator 806 at each end. As discussed above, each remote circulator may be categorized as a proximal circulator 906 and a distal circulator 908. When using a proximal circulator 906 and a distal circulator 908, light from the fiber section before proximal circulator 906, and light from the fiber section below the remote circular 806 are detected, which is illustrated in FIGS. 15A-16. There is a gap 1500 between them of "no light" that depends on the total length of fiber (summed) between proximal circulator 906 and a distal circulator 908 (e.g., referring to FIG. 14).

Referring back to FIG. 14, with $t_{s1}$ the duration of the light from fiber sensing section before proximal circulator 906, $t_{sep}$ the "dead time" separating the two sections (and due to the cumulative length of first fiber optic cable 804 and second fiber optic cable 808 between proximal circulator 906 and a distal circulator 908), and $t_{s2}$ the duration of the light from the sensing fiber, downhole sensing fiber 132, beyond distal circulator 908, the constraints on fiber lengths and pulse intervals may be identified as:

$$i. t_{rep} < t_{sep} \qquad (3)$$

$$ii. (2t_{rep}) > (t_{s1} + t_{sep} + t_{s2}) \qquad (4)$$

Criterion (i) ensures that "pulse n" light from downhole sensing fiber 132 does not appear while "pulse n+1" light from fiber before proximal circulator 906 is being received at interrogator unit 128 (e.g., referring to FIGS. 1A and 1B). Criterion (ii) ensures that "pulse n" light from downhole sensing fiber 132 is fully received before "pulse n+2" light from fiber before proximal circulator 906 is being received at interrogator unit 128. It should be noted that the two criteria given above only define the minimum and maximum $t_{rep}$ for scenarios where two pulses are launched in the fiber before backscattered light below the remote circulator 806 is received. However, it should be appreciated that for those skilled in the art these criteria may be generalized to cases where n∈{1,2,3, . . . } light pulses may be launched in the fiber before backscattered light below the remote circulator 806 is received.

Figure 17:
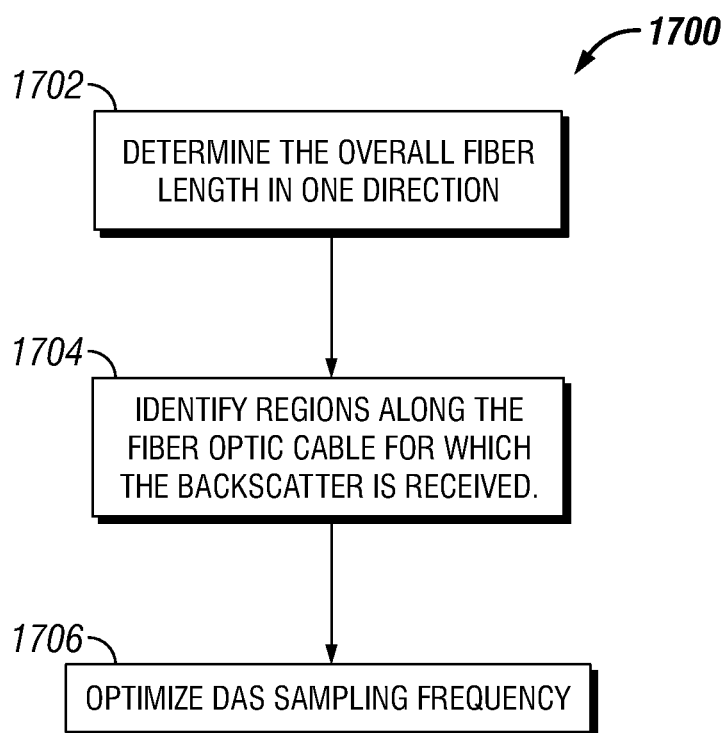
FIG. 17 illustrates an example of a workflow for optimizing the sampling frequencies of the DAS system.

The use of remote circulators 806 may allow for FOS system 126, a DAS system, (e.g., referring to FIG. 8) to increase the DAS pulse repetition rate, or sampling frequency. FIG. 17 illustrates workflow 1700 for optimizing sampling frequency when using a remote circulator 806 in FOS system 126. One skilled in the art will appreciate the subtlety that optimizing the sampling frequency doesn't imply maximizing the sampling frequency. Workflow 1700 may begin with block 1702, which determines the overall fiber length in both directions. For example, in case of a 17 km of first fiber optic cable 804 and 17 km of second fiber optic cable 808 before distal circulator 908 and 8 km of sensing fiber, downhole sensing fiber 132, after distal circulator 908, the overall fiber optic cable length in both directions would be 50 km. Assuming a travel time of the light of 5 ns/m, the following equation may be used to calculate a first DAS sampling frequency $f_s$ $$f_s = \frac{1}{t_s} = \frac{1}{5 \cdot 10^{-9} \cdot z} \qquad (5)$$

where $t_s$ is the DAS sampling interval and z is the overall two-way fiber length. Thus, for an overall two-way fiber length of 50 km the first DAS sampling rate $f_s$ is 4 kHz. In block 1704 regions of the fiber optic cable are identified for which backscatter is received. For example, this is done by calculating the average optical backscattered energy for each sampling location followed by a simple thresholding scheme. The result of this step is shown in FIG. 15A where boundaries 1502 identify two sensing regions 1504. As illustrated in FIG. 15A-15C, optical energy is given as:

$$I^2 + Q^2 \qquad (6)$$

where I and Q correspond to the in-phase (I) and quadrature (Q) components of the backscattered light. In block 1706, the sampling frequency of FOS system 126, a DAS system, is optimized. To optimize the sampling frequency a minimum time interval is found that is between the emission of light pulses such that at no point in time backscattered light arrives back at interrogator unit 128 (e.g., referring to FIG. 1) that corresponds to more than one spatial location along a sensing portion of the fiber-optic cable. Mathematically, this may be defined as follows. Let S be the set of all spatial sample locations x along the fiber for which backscattered light is received. The desired light pulse emission interval $t_s$ is the smallest one for which the cardinality of the two sets S and {mod(x, $t_s$): x∈ S} is still identical, which is expressed as:

$$\min_{t_s}(t_s) \text{ s.t. } |S| = |\{\text{mod}(x, t_s): x \in S\}| \qquad (7)$$

where |•| is the cardinality operator, measuring the number of elements in a set. FIG. 16 shows the result of optimizing the sampling frequency from FIGS. 10A-10C with workflow 1700. Here, the DAS sampling frequency may increase from 4 kHz to 12.5 kHz without causing any overlap in backscattered locations, effectively increasing the signal to noise ratio of the underlying acoustic data by more than 5 dB due to the increase in sampling frequency.

Figure 18:
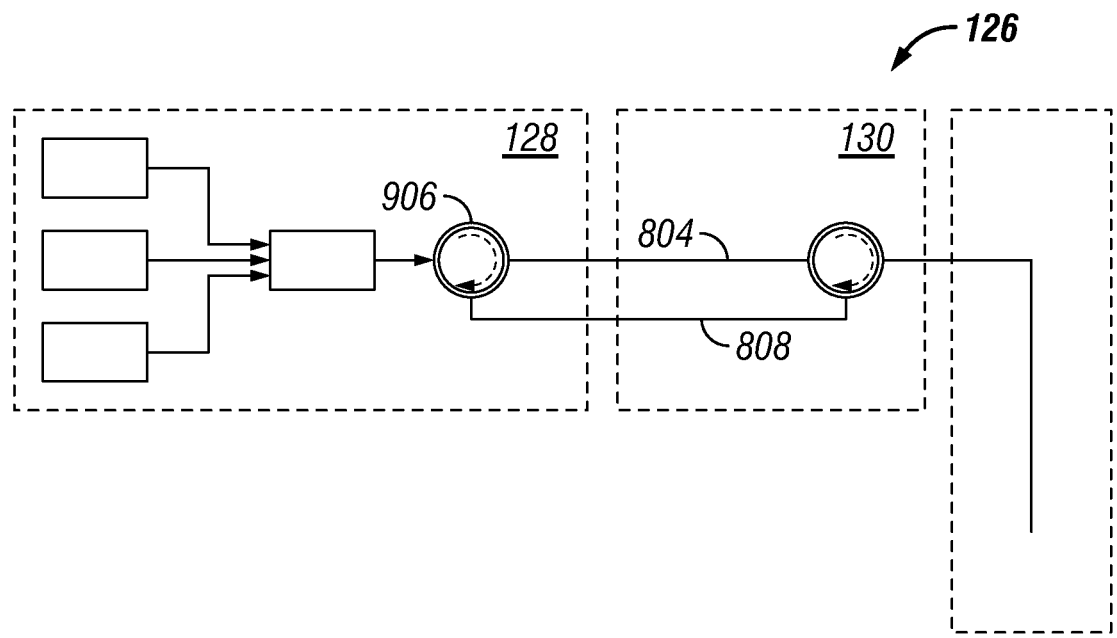
FIGS. 18-28 illustrate other examples of the FOS system.
Figure 19:
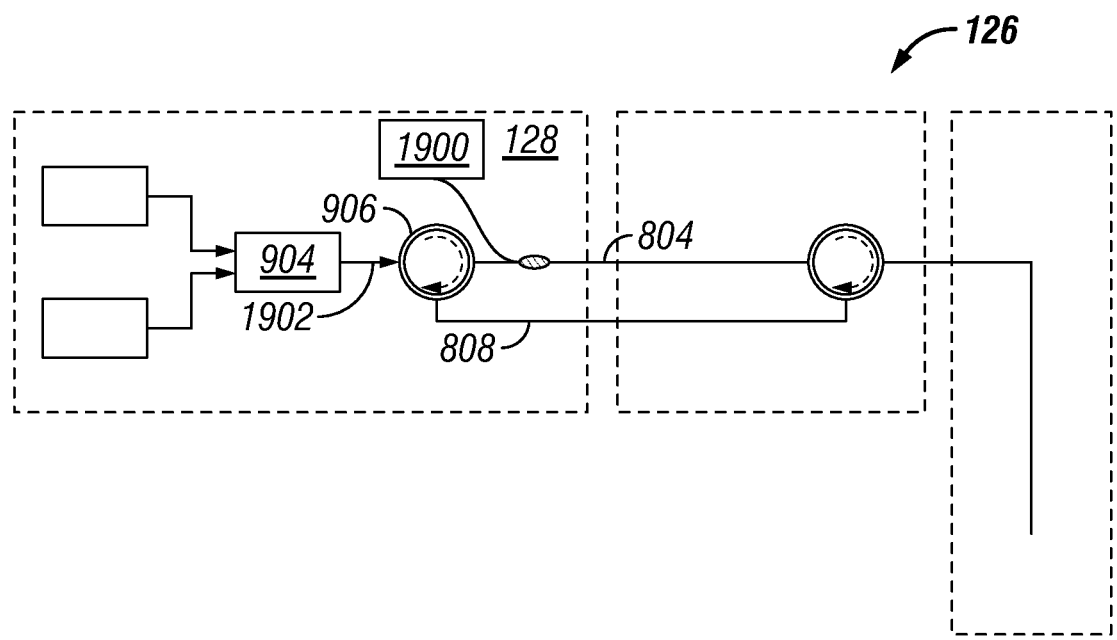
Figure 20:
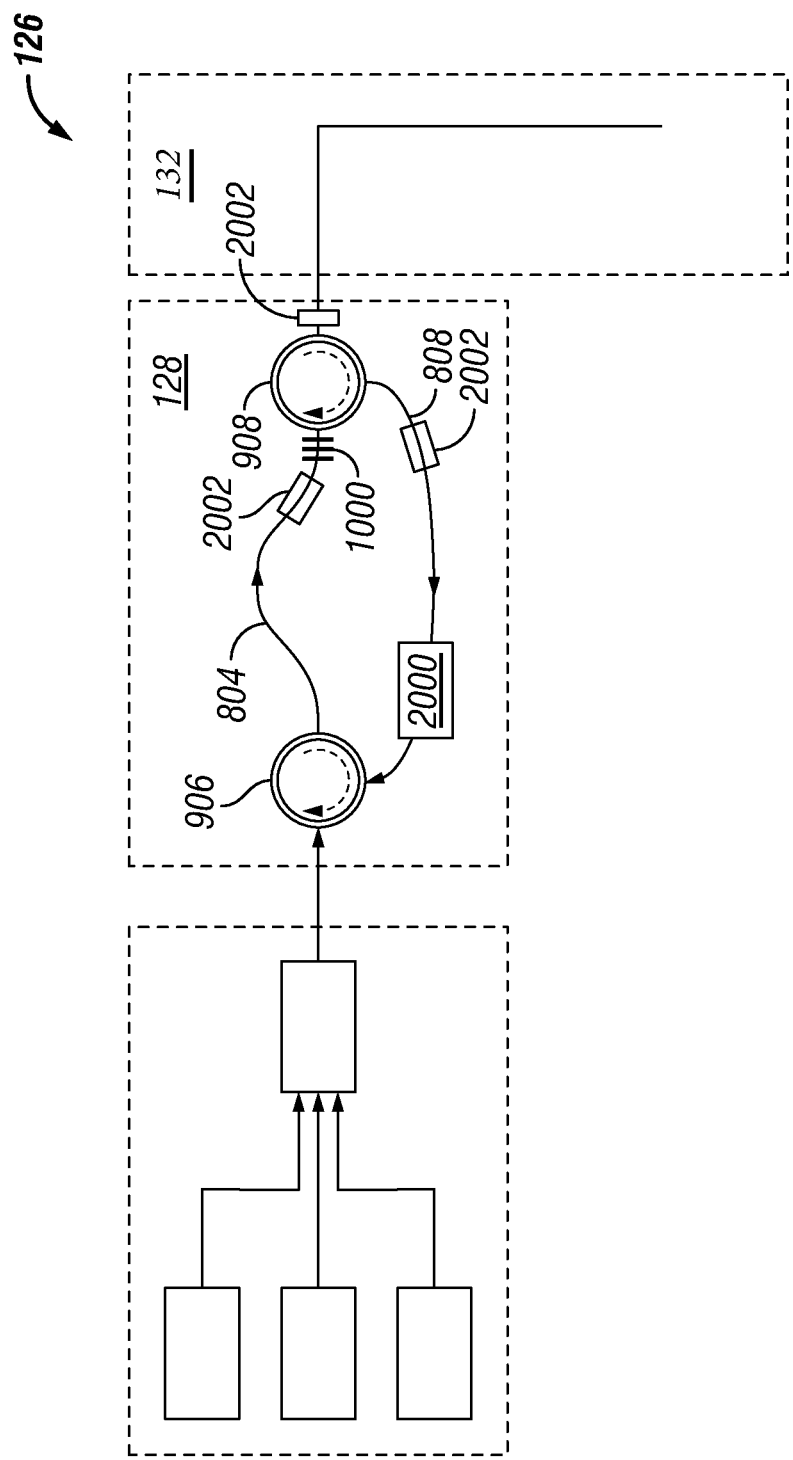

Variants of FOS system 126, which may be DAS based, may also benefit from workflow 1700. For example, FIG. 18 illustrates FOS system 126 in which proximal circulator 906 is placed within interrogator unit 128. This system set up of FOS system 126 may allow for system flexibility on how to implement during measurement operations and the efficient placement of Raman Pump 1900. As illustrated in FIGS. 19 and 20, first fiber optic cable 804 and second fiber optic cable 808 may connect interrogator unit 128 to umbilical line 130, which is described in greater detail above in FIG. 8.

FIG. 19 illustrates another example of DAS system 126 in which Raman Pump 1900 is operated in co-propagation mode and is attached to first fiber optic cable 804 after proximal circulator 906. For example, if the first sensing region before proximal circulator 906 should not be affected by Raman amplification. Moreover, Raman Pump 1900, may also be attached to second fiber optic cable 808 which may allow the Raman Pump 1900 to be operated in counter-propagation mode. In examples, the Raman Pump may also be attached to fiber 1902 between WDM 904 and proximal circulator 906 in interrogator unit 128.

FIG. 20 illustrates another example of FOS system 126 in which an optical amplifier assembly 2000 (i.e., an Erbium doped fiber amplifier (EDFA)+Fabry-Perot filter) may be attached to proximal circulator 906, which may also be identified as a proximal locally pumped optical amplifier. In examples, a distal optical amplifier assembly 2002 may also be attached at distal circulator 908 on first fiber optical cable 804 or second fiber optical cable 808 as an inline or "mid-span" amplifier. In examples, optical amplifier assembly 2002 located in-line with fiber optical cable 804 and above distal circulator 908 may be used to boost the light pulse before it is launched into the downhole sensing fiber 132. Referring to FIGS. 10B and 10C, the effect of using an optical amplifier assembly 2000 in-line with a second fiber optic cable 808 prior to proximal circulator 906 and/or using an distal optical amplifier assembly 2002 located in line with second fiber optical cable 808 above distal circulator 908 may allow for selectively amplifying the backscattered light originating from downhole sensing fiber 132 which tends to suffer from much stronger attenuation as it travels back along downhole sensing fiber 132 and second fiber optical cable 808 than backscattered light originating from shallower sections of fiber optic cable that may also perform sensing functions. FIG. 10B illustrates measurements where proximal circulator 906 is active (optical amplifier assembly 2000 in-line with a second fiber optic cable 808 prior to proximal circulator 906 and/or distal optical amplifier assembly 2002 located in line with second fiber optical cable 808 above distal circulator 908 is used). FIG. 10C illustrates measurements where proximal circulator 906 is passive (no optical amplification is used in-line with second fiber optic cable 808). In FIGS. 10B and 10C, boundaries 1502 identify two sensing regions 1504. Additionally, in FIGS. 10B and 10C the DAS sampling frequency is set to 12.5 kHz using workflow 1700. Further illustrated Fiber Bragg Grating 1000 may also be disposed on first fiber optical cable 804 between distal optical amplifier assembly 2002 and distal circulator 908.

During operation, data quality from a FOS system 126, such as a DAS system, (e.g., referring to FIG. 7) may be governed by signal quality and sampling rate. Signal quality is predominantly constrained by the power of backscattered light and sampling rate is constrained by sensing fiber length. For example, the less backscattered light that is received from a sensing fiber, which may be downhole sensing fiber 132 or disposed on downhole sensing fiber 132 (e.g., referring to FIGS. 1A and 1B), the more inferior the quality of the measurement taken by FOS system 126.

Figure 21:
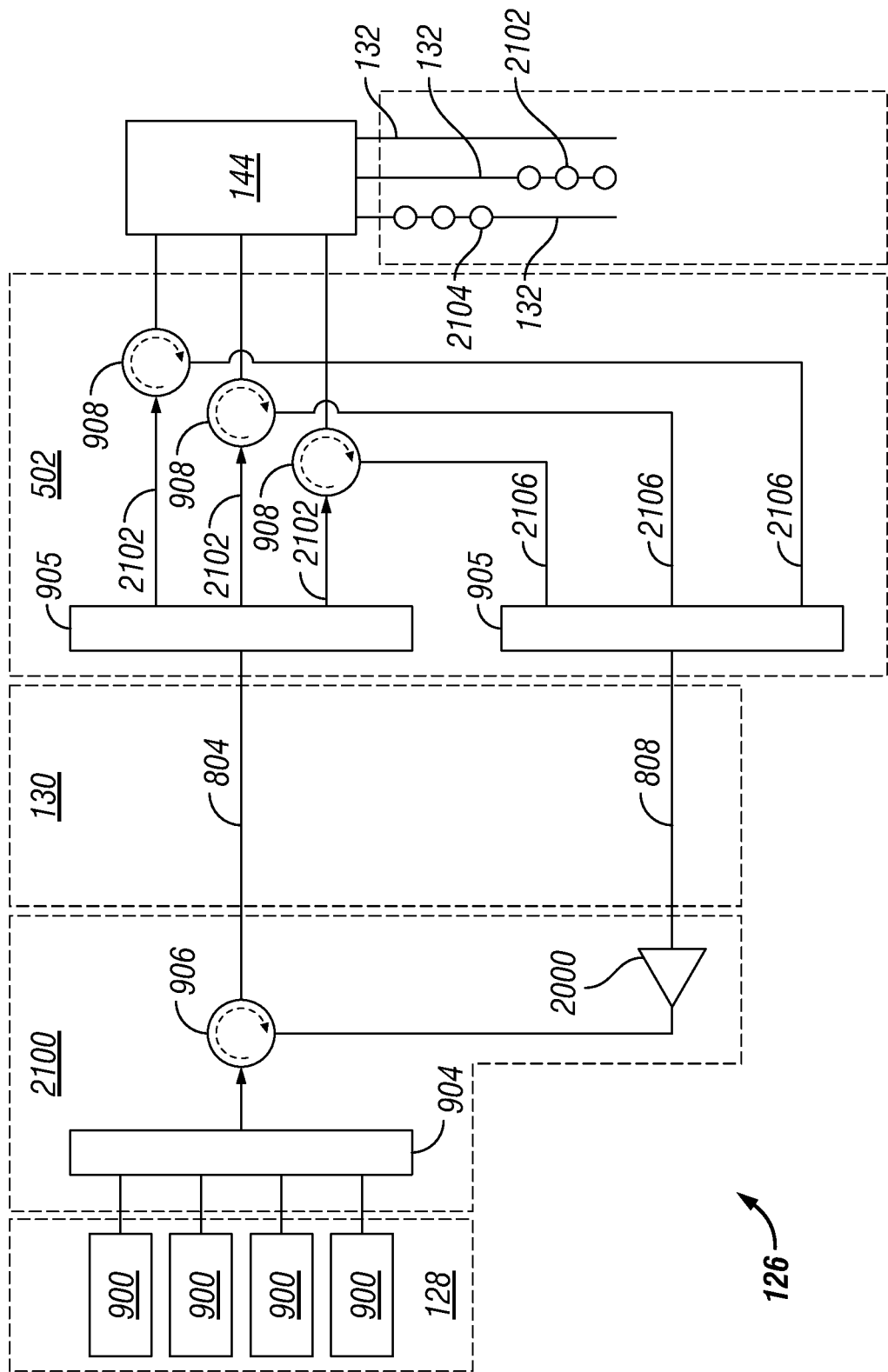

FIG. 21 illustrates an example of FOS system 126 (e.g., referring to FIGS. 1A and 1B) in which multiple downhole sensing fibers 132 are utilized. As discussed above, in reference to FIGS. 6B, legacy optical feedthrough system technology connects a single fiber from an optical flying lead 142 to a single downhole sensing fiber 132. FIG. 21 illustrates an example FOS system 126 that may utilize a single umbilical line 130 to service multiple downhole sensing fibers 132 through a single connection. Generally, at surface on vessel 102 (e.g., referring to FIGS. 1A and 1B) FOS system 126 may originate with interrogator unit 128. Interrogator unit 128 may include one or more interrogator units 900, including but not limited to DAS, DTS, DSS, DBFS, and/or FBG interrogators, each emitting light pulses at a distinct optical wavelength, connected to at least one wavelength division multiplexer 904 (WDM) disposed in WDM compartment 2100. It should be noted that WDM 904 may also be referred to as a "proximal WDM." Thus, WDM compartment 2100 may be separate and apart from interrogator unit 128. However, in example, WDM compartment 2100 may be merged into interrogator unit 128. In other examples, WDM 904 may not be disposed in a WDM compartment 2100 but may be integrated into interrogator unit 128, umbilical line 130, optical flying lead 142, optical feedthrough system 144, and/or one or more downhole sensing fibers 132. WDM 904 may contain with fiber stretchers. Without limitation, WDM 904 may include a multiplexer assembly that multiplexes the light received from the plurality of interrogator units 900 onto a single optical fiber and a demultiplexer assembly that separates the multi-wavelength backscattered light into its individual frequency components and redirects each single wavelength backscattered light stream back to the corresponding interrogator unit 900. In an example, WDM 904 may utilize an optical add-drop multiplexer to enable multiplexing the light received from the one or more interrogator units 900 and demultiplexing the multi-wavelength backscattered light received from a single fiber. WDM 904 may also include circuitry to optically amplify the multi-frequency light prior to launching it into the single optical fiber and/or optical circuitry to optically amplify the multi-frequency backscattered light returning from the single optical fiber, thereby compensating for optical losses introduced during optical (de-)multiplexing.

As illustrated, interrogator unit 128 may connect to WDM compartment 2100, which may connect to umbilical line 130. In examples, light originating from WDM 904 may interact with a proximal circulator 906. In examples, proximal circulator 906 may be disposed in WDM compartment 2100. In other examples, proximal circulator 906 may be disposed within umbilical line 130 or interrogator unit 128 (as seen in FIGS. 18-20). Moving through proximal circulator 906, light may traverse through first fiber optic cable 804, which may also be identified as a "down-going transmission fiber." The light may then pass from umbilical line 130 to optical flying lead 142, as discussed above. Within flying optical lead 142 containing an integrated compartment 502 (e.g., referring to FIG. 5), one or more WDM 905 and one or more distal circulators 908 may be disposed. It should be noted that WDM 905 may be referred to as "distal WDM" or "distal down-going WDM." Additionally, as noted above, integrated compartment 502 may be disposed in umbilical line 130, optical feedthrough system 144, or between optical feedthrough system 144 and downhole sensing fibers 132. WDM 905 may operate and function to split light from first fiber optic cable 804 into one or more fiber optic cables 2102 within integrated compartment 502. Each fiber optic cable 2102 may connect to a distal circulator 908 which are also disposed in integrated compartment 502. Each fiber optical cable 2102 may connect to a downhole sensing fiber 132 through optical feedthrough system 144 as described above in FIGS. 6A and 6B.

Each downhole sensing fiber 132 may be include one or more fiber optic sensors 2104. Additionally, some downhole sensing fiber 132 may not include any fiber optic sensors 2104 and may be used for distributed acoustic and/or temperature measurements of the optical fiber. Fiber optic sensors 2104 may include, but are not limited to fiber optic pressure, temperature, chemical, and/or voltage sensors. Light traversing downhole sensing fiber 132 may generate backscatter, which traverses thorough optical feedthrough system 144 and back to optical flying lead 142. At some point, the backscatter light enters integrated compartment 502. In integrated compartment 502 the backscattered light may interact with distal circulator 908 on each fiber optic cable 2102. Distal circulator 908 may route backscattered light through secondary fiber optic cable 2106, which leads to another WDM 905. It should be noted that WDM 905 may also be referred to as "distal WDM" or "distal up-going WDM." WDM 905 may then operate and function as described above to combine light form each secondary fiber optic cables 2106 into second fiber optic cable 808, which may also be identified as "upgoing transmission fiber." In other examples, WDM 905 may not be disposed in integrated compartment 502 but may be integrated into interrogator unit 128, umbilical line 130, optical flying lead 142, optical feedthrough system 144, and/or one or more downhole sensing fibers 132. Similar to FIG. 20, in examples, an optical amplifier assembly 2000 may be placed in-line with a second fiber optic cable 808 prior to proximal circulator 906, within umbilical line 130. Backscatter light traversing through second fiber optic cable 808 may then interact with proximal circulator 906, which may direct backscatter light to interrogator unit 128 to be measured and/or recorded as described above. One skilled in the art will appreciate that the distal assembly of WDM 905 and circulators 908 may be integrated in an optical flying lead 142, optical feedthrough system 144, umbilical line 130, or maybe integrated elsewhere in the subsea optical distribution system as matter of convenience as they may be contained in integrated compartment 502, which may be disposed at any spot in FOS system 126.

Figure 22:
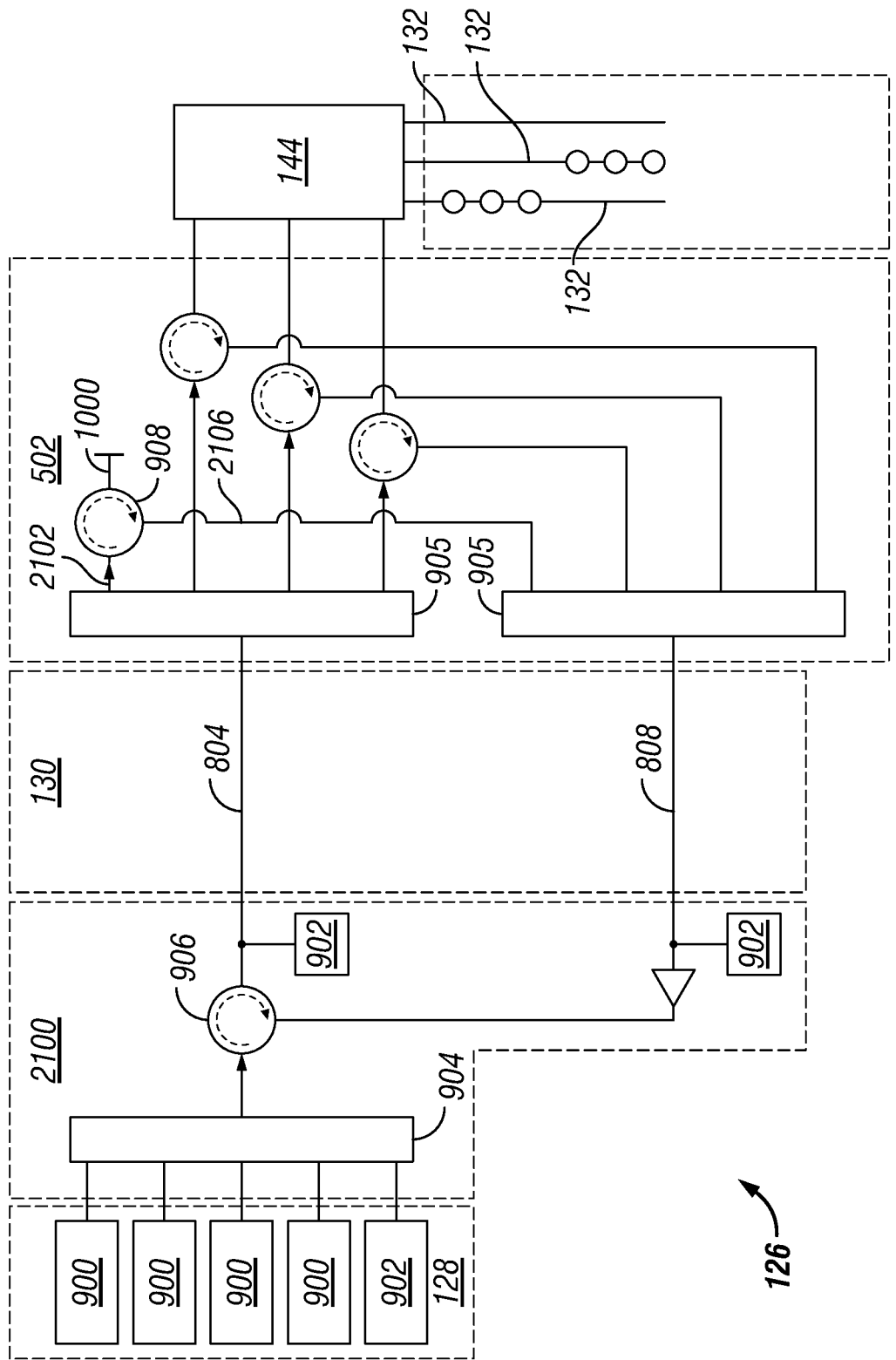

FIG. 22 illustrates and example of FOS system 126, as illustrated in FIG. 21, with a Raman Pump 902 which is connected to a WDM 904, which is disposed in WDM compartment 2100. Raman Pump 902 may be a co-propagating optical pump based on stimulated Raman scattering, to feed energy from a pump signal to a main pulse from one or more FOS interrogator units 900 as the main pulse propagates down one or more fiber optic cables. As illustrated, Raman Pump 902 is located in interrogator unit 128 for co-propagation. In another example, Raman Pump 902 may be located topside either in line with first fiber optic cable 804 (co-propagation mode) and/or in line with second fiber optic cable 808 (counter-propagation) in WDM compartment 2100. In another example, Raman Pump 902 is marinized and located after distal circulator 908 configured either for co-propagation or counter-propagation. In still another example, the light emitted by the Raman Pump 902 is remotely reflected by using a wavelength-selective filter beyond distal circulator 908 in order to provide amplification in the return path using a Raman Pump 902 in any of the topside configurations outlined above. The wavelength-selective filter beyond distal circulator 908 may also be used to ensure the high optical power of Raman Pump 902 is reflected from low power optical components, such as the optical wet-mate connectors in optical feedthrough system 144.

With continued reference to FIG. 22, a WDM 905 in integrated compartment 502 may split light coming from first fiber optic cable 804. Integrated compartment 502 may be disposed at any location in FOS system 126 as described above. When splitting light in WDM 905 Raman light from Raman Pump 902 may enter a fiber optic cable 2102 with a dedicated distal circulator 908. Raman Pump light may traverse through fiber optic cable 2102 and through distal circulator 908 to a Fiber Bragg Grating 1000, which may be referred to as a filter mirror that may be a wavelength specific high reflectivity filter mirror or filter reflector that may operate and function to recirculate unused light back through the optical circuit for "double-pass" co/counter propagation Raman amplification of the FOS signals. In examples, this wavelength specific "Raman light" mirror may be a dichroic thin film interference filter, Fiber Bragg Grating 1000, or any other suitable optical filter that passes only the forward propagating FOS interrogation pulse light while simultaneously reflecting most of the residual Raman Pump light. The reflected Raman Pump light may traverse back through distal circulator 908 and through secondary fiber optic cables 2104 to a second WDM 905, which may recombine backscatter light and the Raman Pump light. This may allow for the backscatter light to traverse back up umbilical line 130 to interrogator unit 128.

Figure 23:
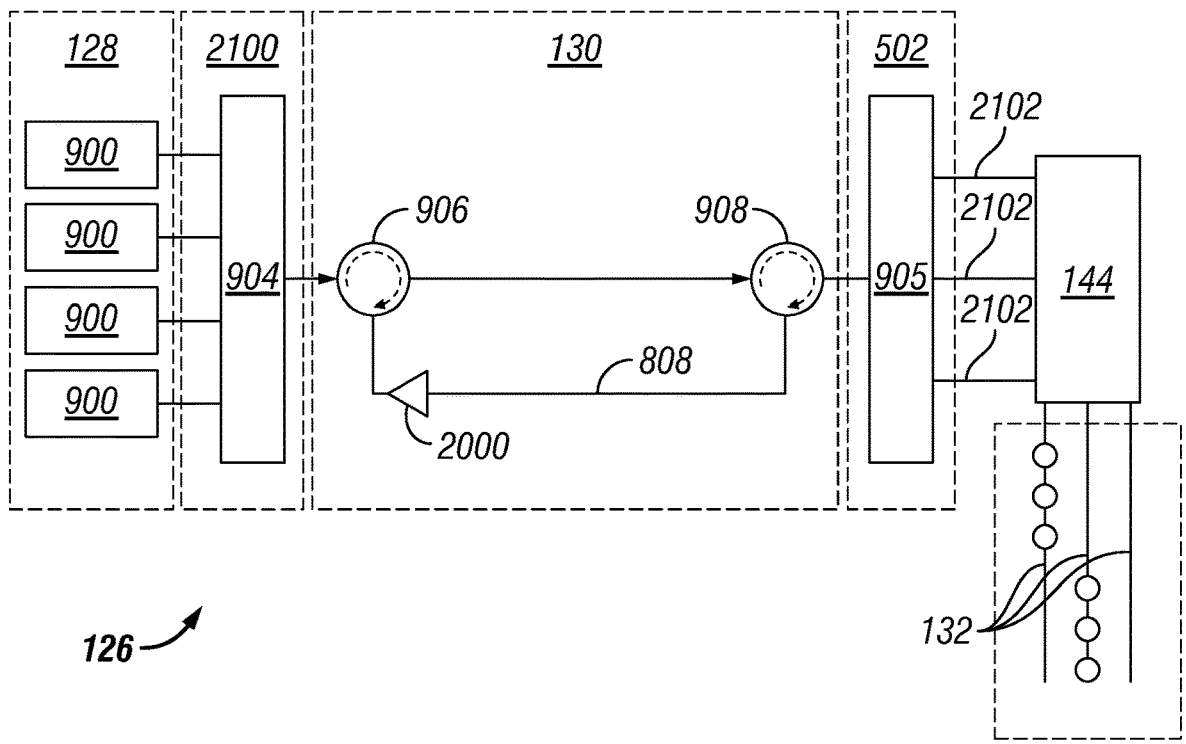

FIG. 23 illustrates another example of FOS system 126 where proximal circulator 906 and distal circulator 908 may be disposed in umbilical line 130, similar to examples in FIGS. 9 and 20. In such example, WDM 905 may be a single device in integrated compartment 502. From WDM 905, individual fiber optic cables 2102 may mate with downhole sensing fibers 132 through optical feedthrough system 144 as discussed above. Backscatter light may flow from downhole sensing fibers 132 back to WDM 905 in integrated compartment 502 to be recombined, as discussed above. From WDM 905 in integrated compartment 502, backscatter light may interact with distal circulator 908 disposed in umbilical line 130, which may move backscatter light into second fiber optic cable 808 and optical amplifier assembly 2000, which is discussed in detail above. Backscatter light may then interact with proximal circulator 906, disposed in WDM compartment 2100, where it is directed back to interrogator unit 128 to be measured and recorded.

Figure 24:
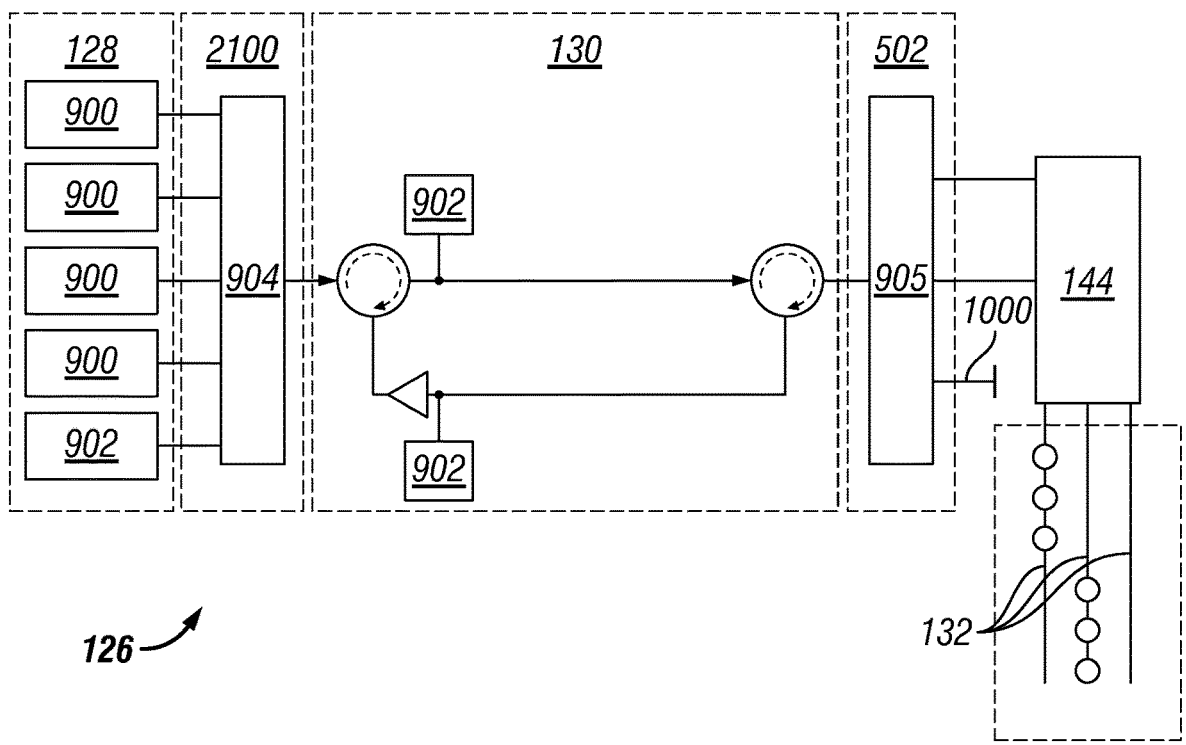

FIG. 24 illustrates another example of FOS system 126 with a Raman Pump 902. Raman Pump 902 may function and/or operate as discussed above for FIGS. 9 and 22. As illustrates, in integrated compartment 502, WDM 905 may split out Raman light from Raman Pump 902 and may enter a fiber optic cable 2102 with a dedicated Fiber Bragg Grating 1000, which may be referred to as a filter mirror that may be a wavelength specific high reflectivity filter mirror or filter reflector that may operate and function to recirculate unused light back through the optical circuit for "double-pass" co/counter propagation Raman amplification of the FOS signals. In examples, this wavelength specific "Raman light" mirror may be a dichroic thin film interference filter, Fiber Bragg Grating 1000, or any other suitable optical filter that passes only the forward propagating FOS interrogation pulse light while simultaneously reflecting most of the residual Raman Pump light. The reflected Raman Pump light may traverse back through WDM 905, which may recombine backscatter light and the Raman Pump light in integrated compartment 502. This may allow for the backscatter light to traverse back up umbilical line 130, through WDM 904 in WDM compartment 2100 and to interrogator unit 128.

FIGS. 21 to 24 have shown dual transmission fibers leading to the distal WDM and circulator assembly, whether the distal WDM and circulator assembly is integrated in an optical flying lead, integrated in an optical feedthrough system, or integrated elsewhere in the subsea optical distribution system as matter of convenience in an integrated compartment. This dual transmission fiber configuration enables optimization of the FOS pulse repetition rates for sensing the downhole sensing fiber, for data quality and fidelity advantages previously described. One skilled in the art will appreciate that a simpler embodiment may only employ a distal WDM and no circulators. This would forgo optimization of the FOS pulse repetition rates for sensing the downhole sensing fiber but would still enable multiple interrogators to sense multiple downhole sensing fibers with a single transmission fiber providing optical continuity between the interrogators and downhole sensing fibers. The distal WDM may be integrated in an optical flying lead, integrated in an optical feedthrough system, or integrated elsewhere in the subsea optical distribution system as matter of convenience in an integrated compartment.

Figure 25:
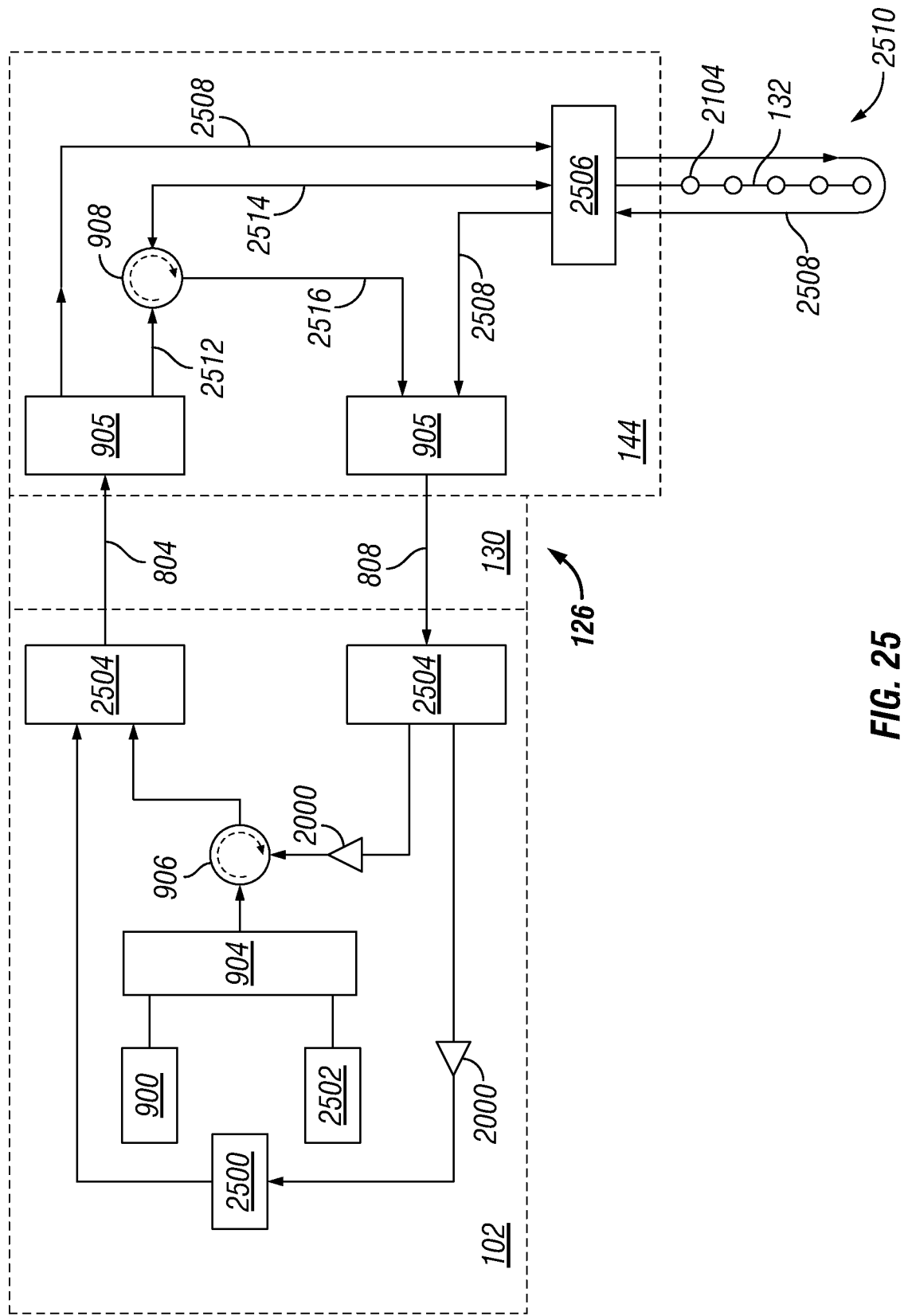

FIG. 25 illustrates another example of FOS system 126 in which a Brillouin Optical Time Domain Analyzer (BOTDA) unit 2500 may be utilized for downhole measurements. For BOTDA unit 2500, two fibers or multicore single mode fiber may be utilized to form an optical loop, referred to below as loop 2510, to allow stimulated Brillouin gain via synchronous counterpropagating pump and probe light pulse. As illustrated in this example, measurement equipment may be disposed on floating vessel 102 in any suitable arrangement. For example, DAS interrogation unit 900 and FBG interrogation unit 2502 (i.e., a type of interrogator unit 128) may connect to WDM 904. As disclosed above, WDM 904 may combine light pulses from DAS interrogation unit 900 and FBG interrogation unit 2502 on to a single fiber optic cable that is connected to a proximal circulator 906. It should be noted that light pulse from DAS interrogation unit 900, FBG interrogation unit 2502 and/or BOTDA interrogator unit 2500 may also be identified as measurements signals. Proximal circulator 906 is connected to another WDM 2504, which operates and function to combine signals from BOTDA interrogator unit 2500 and proximal circulator 906 on to first fiber optic cable 804, which may traverse the length of umbilical line 130 to optical feedthrough system (OFS) 144 in the subsea Christmas tree (XT) 2506. Disposed within OFS 144 and/or XT is WDM 905 which is attached to first fiber optic cable 804. In this example, WDM 905 may split light pulses from DAS interrogation unit 900, FBG interrogation unit 2502 and/or BOTDA interrogator unit 2500. For example, DAS interrogation unit 900 may operate at about 1550 nm wavelength or 1400 nm to 1600 nm. A DTS interrogation unit may operate at about 1553 nm wavelength or 1400 nm to 1600 nm. A FOC system may operate at about 1490 nm wavelength or 1300 nm to 1600 nm. Measurement signals from DAS interrogation unit 900, FBG interrogation unit 2502 and/or BOTDA interrogator unit 2500 may be embodied in light pulses, as described above. Measurements may comprise, but are not limited to, acoustic measurements, vibration measurements, strain measurements, temperature measurements, pressure measurements, chemical measurements, voltage measurements, and/or the like.

As illustrated, light pulses from BOTDA interrogator unit 2500 may traverse through OFS 144 and into wellbore 122 (e.g., referring to FIG. 1) on fiber optic cable 2508. Fiber optic cable 2508 may form a loop 2510. Loop 2510 may be formed by splicing the ends of two downhole sensing fibers 132 (e.g., referring to FIG. 24) in an appropriate cable end termination assembly so as to form a u-turn. During measurement operations, BOTDA interrogator unit 2500 may transmit a light pulse along the path described above and through loop 2510. Measurements may be taken as light pulses traverse through loop 2510 by the generation of stimulated Brillouin backscatter when counterpropagating pump and probe light pulses interact in the silica fiber. In this case fiber strain and temperature both affect the fundamental vibrational acoustic phonon energy of the silica fiber in a manner to encode strain and temperature changes as a change of Brillouin acoustic phonon frequency, which is in the range of about 10-12 GHz in ordinary single mode silica fibers. Brillouin acoustic phonon frequency transfer functions are typically about 50 kHz/microstrain and about 1 MHz per Degree-K (or Degree-C). In examples, light pulses may travers through loop 2510 in any direction. Additionally, after light pulses traverse through loop 2510, the light pulses continue to travers through fiber optic cable 2508 through OFS 144 to WDM 905.

Light pulses from DAS interrogation unit 900 and FBG interrogation unit 2502, which were separated from light pulses form BOTDA interrogator unit 2500 at WDM 905 traverse through fiber optic cable 2512 to distal circulator 908. At distal circulator 908, light pulses from DAS interrogation unit 900 and FBG interrogation unit 2502 traverse to XT 2506 through fiber optic cable 2514 and connect to one or more downhole sensing fibers 132. Downhole sensing fiber 132 may be include one or more fiber optic sensors 2104. Additionally, some downhole sensing fiber 132 may not include any fiber optic sensors 2104 and may be used for distributed acoustic and/or temperature measurements of the optical fiber. Fiber optic sensors 2104 may include, but are not limited to fiber optic pressure, temperature, chemical, and/or voltage sensors. Light pulses traversing downhole sensing fiber 132 may generate backscatter at the end of the one or more downhole fibers 132 and traverse back through XT 2506, fiber optic cable 2514, to proximal circulator 908. At proximal circulator 908, the light pulses may travers to WDM 905 using fiber optic cable 2516.

At WDM 905, light pulses from loop 2510 may be combined with light pulses from DAS interrogation unit 900 and FBG interrogation unit 2502 that have been back reflected in downhole sensing fibers 132. Light pulses may move from proximal circulator 908 to WDM 905 where the light pulses may be transferred to second fiber optic cable 808, as described above. Traversing up umbilical line 130 to floating vessel 102, measurement signals and/or communication signals may be split at WDM 2504. As illustrated, BOTDA interrogator unit 2500 light pulses may move from WDM 2504 to an optical amplifier assembly 2000 (i.e., an Erbium doped fiber amplifier (EDFA)+Fabry-Perot filter), which may function and operate as describe above, and then to BOTDA interrogator unit 2500, where the light pulses may be processed as measurement signals. BOTDA interrogator unit 2500 may perform measurement operations by providing measurements of strain and temperature, in a coupled cross-sensitivity measurement. Various methods may be employed to decouple strain and temperature to derive one and/or the other. Typical methods employed include use of loose tube fibers to isolate the fiber from cable strain, when measuring calibrated temperature or temperature changes. Conversely, when measuring strain or strain-only changes, fibers may be tightly coupled to the cable walls or tightly imbedded into the host structure material matrix. As both fibers experience the same temperature at the same location along said wellbore, when calibrated distributed train is desired, two parallel fibers are employed with one fiber tightly-coupled and one fiber loosely coupled to allow subtraction of temperature-induced Brillouin frequency change. In a dual-fiber looped BOTDR arrangement, the directions of forward propagating and counterpropagating pump and probe light can be reversed to alternately measure each of the tightly-coupled and loosely-coupled fibers. Further, light pulses from WDM 2504 may move to an optical amplifier assembly 2000 (i.e., an Erbium doped fiber amplifier (EDFA)+Fabry-Perot filter) that may be attached to proximal circulator 906. These light pulses may utilize proximal circulator 906 to move back to WDM 905 where the light pulses may be split to DAS interrogation unit 900 and FBG interrogation unit 2502, respectfully, for processing information on the light pulses as measurement signals.

Figure 26:
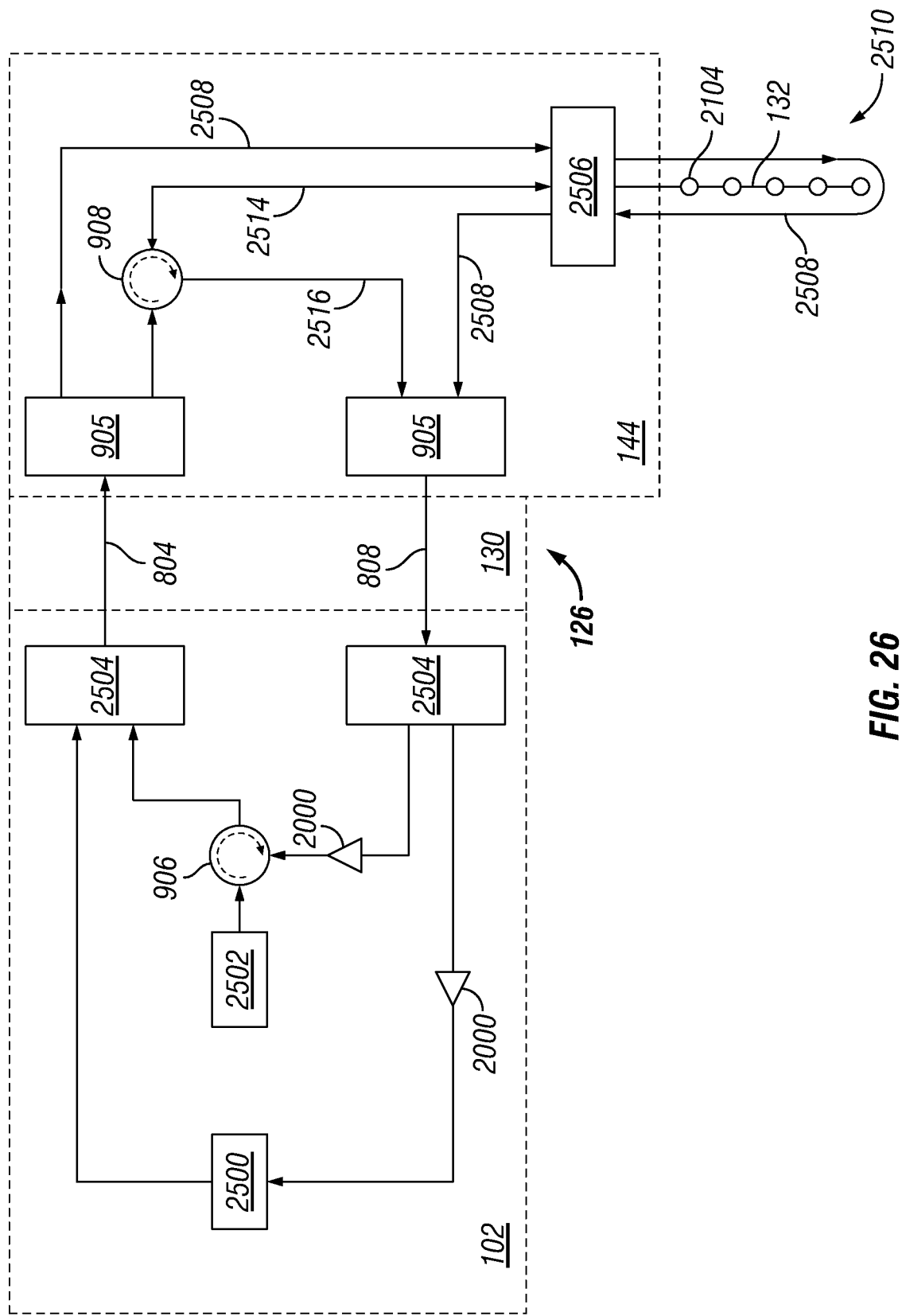

FIG. 26 illustrates FOS system 126 of FIG. 25, except DAS interrogation unit 900 has been removed. In this example, WDM 905 may also be removed as FBG interrogation unit 2502 may connect directly to proximal circulator 906. In this example, FBG interrogation unit 2502 may be utilized in conjunction with BOTDA interrogator unit 2500 to provide discrete downhole pressure and temperature measurements from FBG-based fiber optic pressure and temperature gauges and combine these with distributed temperature and strain measurements from the BOTDA measurements. This combination of measurements may be used to obtain high resolution temperature, pressure, and strain measurements for evaluating reservoir parameters including but not limited to geological integrity, well integrity, production profiling, injection profiling, stimulation efficiency, and multiphase flow characterization.

Figure 27:
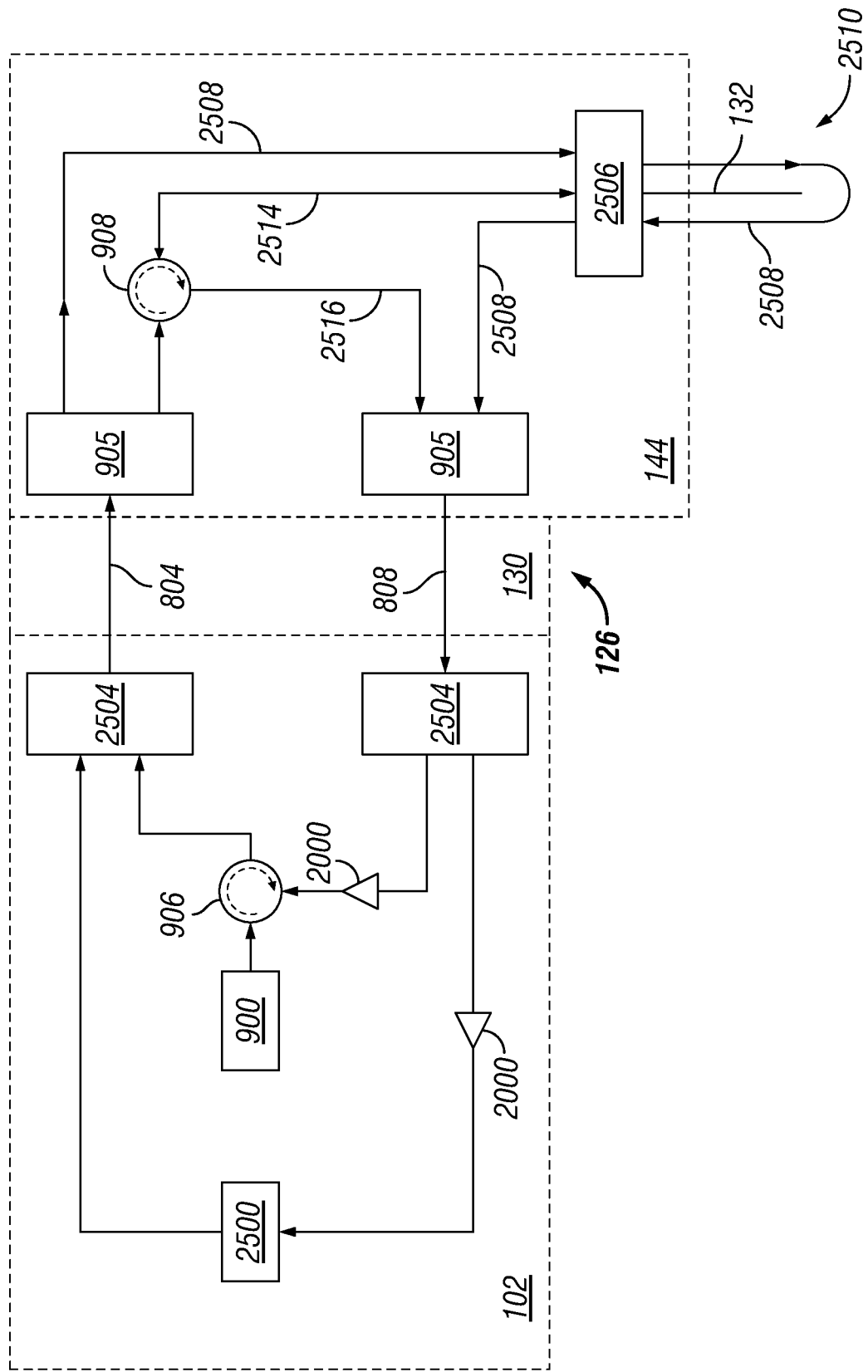

FIG. 27 illustrates FOS system 126 of FIG. 25, except FBG interrogation unit 2502 has been removed. In this example, WDM 905 may also be removed as DAS interrogation unit 900 may connect directly to proximal circulator 906. In this example, DAS interrogation unit 900 may be utilized in conjunction with BOTDA interrogator unit 2500 to provide distributed acoustic measurements from DAS measurements and combine these with distributed temperature and strain measurements from the BOTDA measurements. This combination of measurements may be used to obtain distributed acoustic, temperature, and strain attributes for evaluating reservoir parameters including but not limited to geological integrity, well integrity, production profiling, injection profiling, stimulation efficiency, and multiphase flow characterization.

Figure 28:
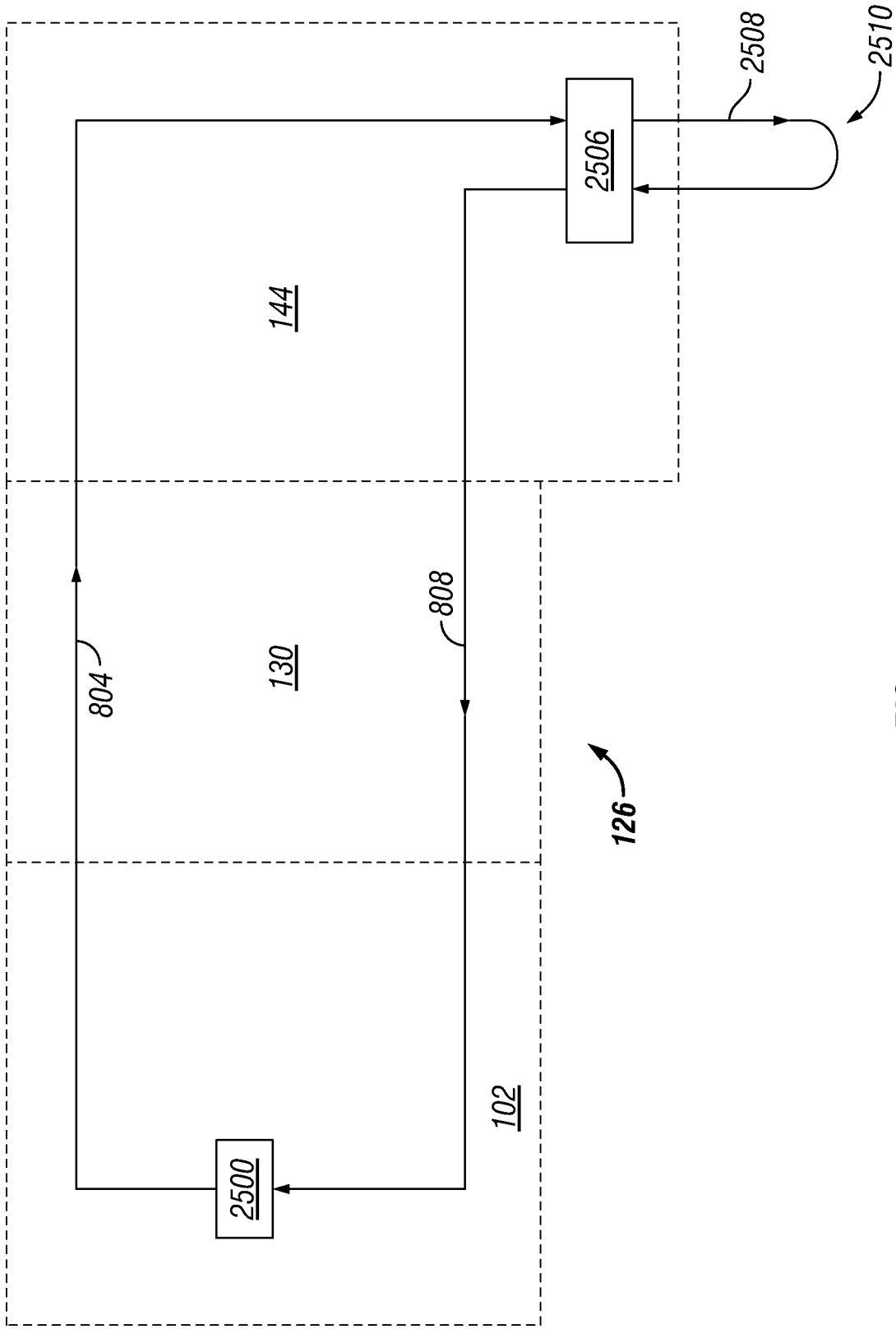

FIG. 28 illustrates FOS system 126 when only BOTDA interrogator unit 2500 is utilized. As illustrated, BOTDA interrogator unit 2500 may connect to a first fiber optic cable 804. First fiber optic cable 804 may traverse from floating vessel 102, umbilical line 130, to OFS 144. It should be noted that first fiber optic cable 804 may be made up of a plurality of smaller fiber optic lines connected together or a single fiber optic line. At OFS 144, first fiber optic cable 804 may connect to fiber optic cable 2508, which is loop 2510. Fiber optic cable 2508 may connect to second fiber optic cable 808 at OFS 144. Thus, fiber optic cable 2508 and loop 2510 may be connected to first fiber optic cable 804 at one end and second fiber optic cable 808 at the opposite end. Second fiber optic cable 808 may traverse from OFS 144, umbilical line 130, to floating vessel 102, and connect to BOTDA interrogator unit 2500. It should be noted that second fiber optic cable 808 may be made up of a plurality of smaller fiber optic lines connected together or a single fiber optic line. BOTDA interrogator unit 2500 may perform measurement operations as described above.

Figure 29:
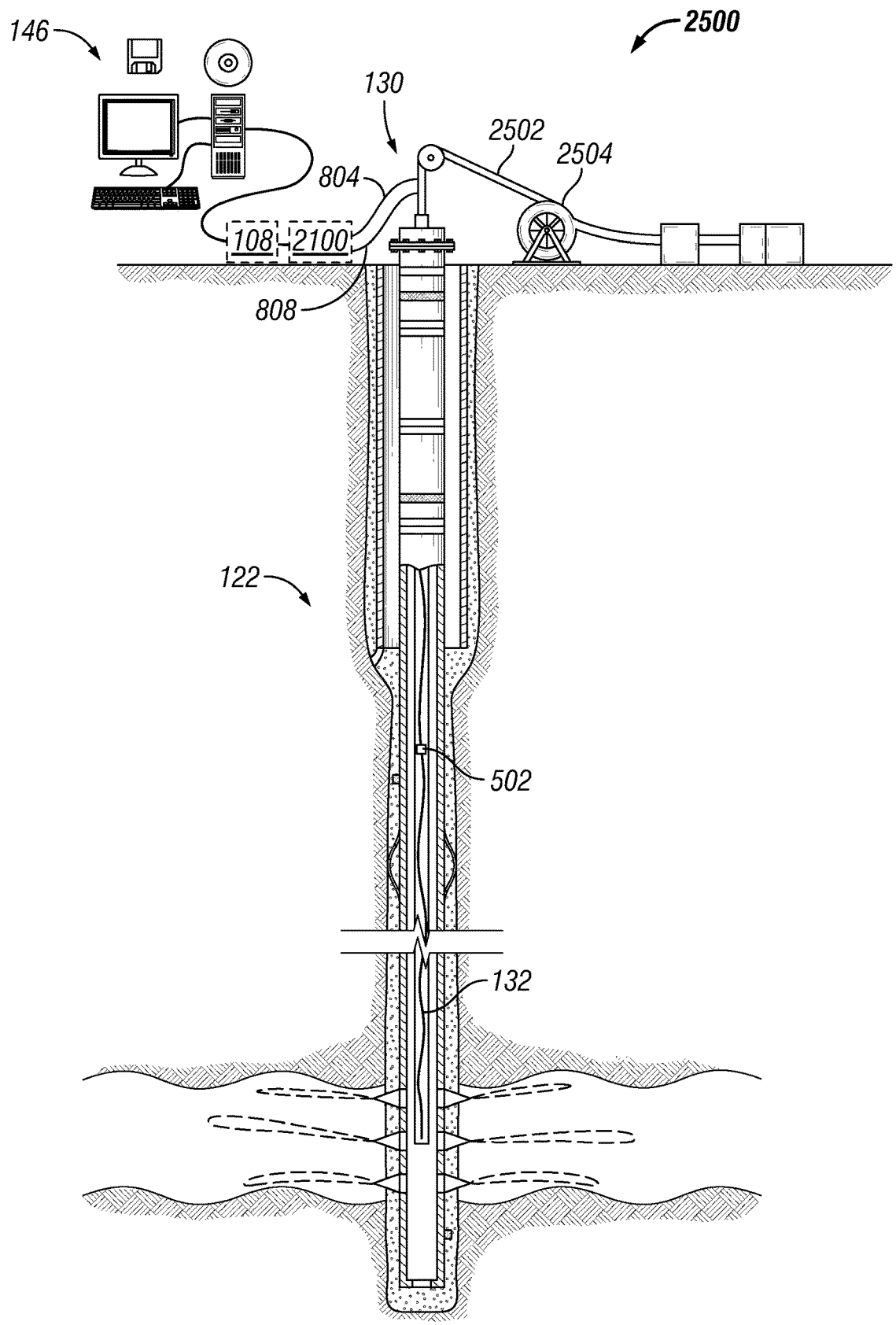
FIG. 29 illustrates an example of the FOS system in a land based well.

FIG. 29 illustrates an example of an onshore well system 2900, which illustrates downhole sensing fibers 132 permanently installed in the completion of an onshore well. Given the use of a dry Christmas tree (or dry-tree), the optical feedthrough system of the subsea tree may be simplified with an appropriate wellhead exit. As illustrated interrogator unit 128 is attached to information handling system 146. Further discussed below, lead lines may connect umbilical line 130 (or surface cables) to interrogator unit 128. Umbilical line 130 may be a surface cable, or a trenched cable, which can include a first fiber optic cable 804 and a second fiber optic cable 808 which may be individual lead lines. Without limitation, first fiber optic cable 804 and a second fiber optic cable 808 may attach to completion system 2902 as umbilical line 130. Umbilical line 130 may traverse through wellbore 122 attached to completion system 2902. Further illustrated in FIG. 29, umbilical line 130 may connect to integrated compartment 502, which may connect umbilical line 130 to one or more downhole sensing fiber 132. This may be performed, function, and/or operate as described above.

Systems and methods described functionally provides an all-optical downhole sensing solution for subsea wells, enabling the simultaneous measurements of temperature, pressure, acoustics, and/or strain in downhole sensing fibers. The system and methods described are inherently compliant with the Intelligent Well Interface Standardization (IWIS) and SEAFOM recommended practices. Systems and methods described functionally provides an all-optical downhole sensing solution for subsea wells. In practice, the systems and methods may minimize the number of transmission fibers providing optical continuity from topside to optical flying lead, thus saving significant complexity and costs in subsea optical infrastructure and installation thereof. Additionally, systems and methods described above can maximize the number of downhole sensing fibers that can be configured for any combination of fiber optic sensing applications. In particular, the systems and methods can enable simultaneous DAS, DSS, DTS, and FBG sensing of subsea completions.

By retaining all electro-optical systems, such as interrogator systems, at the topside, the systems and methods described can eliminate the need for electric downhole sensing systems and their related subsea controls and power distribution systems. For example, to operate an array of electric pressure and temperature gauges across the reservoir using an inductive coupler for power and telemetry between the upper and lower completions introduces significant cost and complexity to the subsea power distribution system. Moreover, interfaces between the electric downhole sensors and the subsea tree control module are eliminated; further simplifying subsea control systems.

The methods and systems describe above are an improvement over current technology. Specifically, the use of dual-fiber loop based BOTDA allows at least an order of magnitude (10×) improvement in strain and temperature measurement precision compared with single-ended fiber-based spontaneous Brillouin Optical Time Domain reflectometry (BOTDR), due to improved optical signal-to-noise ratio and narrower stimulated Brillouin gain spectrum.

The systems and methods for a fiber optic sensing system discussed above, implemented within a subsea environment may include any of the various features of the systems and methods disclosed herein, including one or more of the following statements. Moreover, the systems and methods for a fiber optic sensing system discussed above implemented within an onshore environment may include any of the various features of the systems and methods disclosed herein, including one or more of the following statements.

Statement 1: A fiber optic sensing (FOS) system may comprise a Brillouin Optical Time Domain Analyzer (BOTDA) unit, a first fiber optical cable optically connected to the BOTDA interrogator unit at a first end, and an optical feedthrough system (OFS) optically connected the first fiber optical cable at a second end of the first fiber optical cable. The FOS system may further comprise a fiber optic cable forming a loop within a wellbore that is optically connected to the first fiber optical cable at the OFS and a second fiber optical cable optically connected to the loop at the OFS and wherein the second fiber optical cable is optically connected to the BOTDA interrogator unit.

Statement 2: The FOS system of statement 1, may further comprise a distributed acoustic sensing (DAS) interrogator unit, a proximal circulator optically connected to the DAS interrogator unit, and a proximal wavelength division multiplexer (WDM) optically connected to the proximal circulator and the BOTDA interrogator unit.

Statement 3: The FOS system of statement 2, may further comprises a distal WDM optically connected to the proximal WDM by the first fiber optic cable, a distal circulator optically connected to the distal WDM, and one or more downhole sensing fibers optically connectable to the distal circulator at the OFS.

Statement 4: The FOS system of statement 3, may further comprise one or more temperature sensors disposed on the one of more downhole sensing fibers.

Statement 5: The FOS system of statement 3, may further comprise one or more pressure sensors disposed on the one of more downhole sensing fibers.

Statement 6: The FOS system of statement 3, wherein the proximal WDM and the distal WDM are optically connected by the second fiber optic cable.

Statement 7: The FOS system of statement 3, may further comprise an optical amplifier assembly disposed between the proximal WDM and the DAS interrogator unit.

Statement 8: The FOS system of statement 3, may further comprise an optical amplifier assembly disposed between the proximal WDM and the BOTDA interrogator unit.

Statement 9: The FOS system of statement 3, may further comprise an optical amplifier assembly disposed between the proximal WDM and the proximal circulator.

Statement 10: The FOS system of statements 1 or 2, may further comprise a Fiber Bragg Gratings (FBG) interrogator unit, a proximal circulator optically connected to the FBG interrogator unit, and a proximal wavelength division multiplexer (WDM) optically connected to the proximal circulator and the BOTDA interrogator unit.

Statement 11: The FOS system of claim 10, may further comprise a distal WDM optically connectable to the proximal WDM by the first fiber optic cable, a distal circulator optically connected to the distal WDM, and one or more downhole sensing fibers optically connectable to the distal circulator at the OFS.

Statement 12: The FOS system of statement 11, may further comprise one or more temperature sensors disposed on the one of more downhole sensing fibers.

Statement 13: The FOS system of statement 11, may further comprise one or more pressure sensors disposed on the one of more downhole sensing fibers.

Statement 14: The FOS system of statement 11, wherein the proximal WDM and the distal WDM are optically connected by the second fiber optic cable.

Statement 15: The FOS system of statement 11, may further comprise an optical amplifier assembly disposed between the proximal WDM and the DAS interrogator unit.

Statement 16: The FOS system of statement 11, may further comprise an optical amplifier assembly disposed between the proximal WDM and the BOTDA interrogator unit.

Statement 17: The FOS system of statement 11, may further comprise an optical amplifier assembly disposed between the proximal WDM and the proximal circulator.

Statement 18. The FOS system of statements 1, 2, or 10, may further comprise a Fiber Bragg Gratings (FBG) interrogator unit, a distributed acoustic sensing (DAS) interrogator unit, a proximal circulator optically connected to the FBG interrogator unit and the DAS interrogator unit, and a proximal wavelength division multiplexer (WDM) optically connected to the proximal circulator and the BOTDA interrogator unit.

Statement 19: The FOS system of statement 18, may further comprise a distal WDM optically connected to the proximal WDM by the first fiber optic cable, a distal circulator optically connected to the distal WDM, and one or more downhole sensing fibers optically connectable to the distal circulator at the OFS.

Statement 20: The FOS system of statement 19, further comprising one or more temperature sensors disposed on the one of more downhole sensing fibers.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A fiber optic sensing (FOS) system comprising:
a Brillouin Optical Time Domain Analyzer (BOTDA) unit;
a first fiber optical cable optically connected to the BOTDA interrogator unit at a first end;
an optical feedthrough system (OFS) optically connected the first fiber optical cable at a second end of the first fiber optical cable;
a fiber optic cable forming a loop within a wellbore that is optically connected to the first fiber optical cable at the OFS; and
a second fiber optical cable optically connected to the loop at the OFS and wherein the second fiber optical cable is optically connected to the BOTDA interrogator unit;
a distributed acoustic sensing (DAS) interrogator unit;
a proximal circulator optically connected to the DAS interrogator unit;
a proximal wavelength division multiplexer (WDM) optically connected to the proximal circulator and the BOTDA interrogator unit;
a distal WDM optically connected to the proximal WDM by the first fiber optic cable;
a distal circulator optically connected to the distal WDM; and
one or more downhole sensing fibers optically connectable to the distal circulator at the OFS.

2. The FOS system of claim 1, further comprising one or more temperature sensors disposed on the one of more downhole sensing fibers.

3. The FOS system of claim 1, further comprising one or more pressure sensors disposed on the one of more downhole sensing fibers.

4. The FOS system of claim 1, wherein the proximal WDM and the distal WDM are optically connected by the second fiber optic cable.

5. The FOS system of claim 1, further comprising an optical amplifier assembly disposed between the proximal WDM and the DAS interrogator unit.

6. The FOS system of claim 1, further comprising an optical amplifier assembly disposed between the proximal WDM and the BOTDA interrogator unit.

7. The FOS system of claim 1, further comprising an optical amplifier assembly disposed between the proximal WDM and the proximal circulator.

8. The FOS system of claim 1, further comprising:
a Fiber Bragg Gratings (FBG) interrogator unit;
a proximal circulator optically connected to the FBG interrogator unit; and
a proximal wavelength division multiplexer (WDM) optically connected to the proximal circulator and the BOTDA interrogator unit.

9. The FOS system of claim 8, further comprising:
a distal WDM optically connectable to the proximal WDM by the first fiber optic cable;
a distal circulator optically connected to the distal WDM; and
one or more downhole sensing fibers optically connectable to the distal circulator at the OFS.

10. The FOS system of claim 9, further comprising one or more temperature sensors disposed on the one of more downhole sensing fibers.

11. The FOS system of claim 9, further comprising one or more pressure sensors disposed on the one of more downhole sensing fibers.

12. The FOS system of claim 9, wherein the proximal WDM and the distal WDM are optically connected by the second fiber optic cable.

13. The FOS system of claim 9, further comprising an optical amplifier assembly disposed between the proximal WDM and the DAS interrogator unit.

14. The FOS system of claim 9, further comprising an optical amplifier assembly disposed between the proximal WDM and the BOTDA interrogator unit.

15. The FOS system of claim 9, further comprising an optical amplifier assembly disposed between the proximal WDM and the proximal circulator.

16. The FOS system of claim 1, further comprising:
a Fiber Bragg Gratings (FBG) interrogator unit;
a distributed acoustic sensing (DAS) interrogator unit
a proximal circulator optically connected to the FBG interrogator unit and the DAS interrogator unit; and
a proximal wavelength division multiplexer (WDM) optically connected to the proximal circulator and the BOTDA interrogator unit.

17. The FOS system of claim 16, further comprising:
a distal WDM optically connected to the proximal WDM by the first fiber optic cable;
a distal circulator optically connected to the distal WDM; and
one or more downhole sensing fibers optically connectable to the distal circulator at the OFS.

18. The FOS system of claim 17, further comprising one or more temperature sensors disposed on the one of more downhole sensing fibers.

19. A fiber optic sensing (FOS) system comprising:
a Brillouin Optical Time Domain Analyzer (BOTDA) unit;
a first fiber optical cable optically connected to the BOTDA interrogator unit at a first end;
an optical feedthrough system (OFS) optically connected the first fiber optical cable at a second end of the first fiber optical cable;
a fiber optic cable forming a loop within a wellbore that is optically connected to the first fiber optical cable at the OFS; and
a second fiber optical cable optically connected to the loop at the OFS and wherein the second fiber optical cable is optically connected to the BOTDA interrogator unit;
a Fiber Bragg Gratings (FBG) interrogator unit;
a proximal circulator optically connected to the FBG interrogator unit;
a proximal wavelength division multiplexer (WDM) optically connected to the proximal circulator and the BOTDA interrogator unit;
a distal WDM optically connectable to the proximal WDM by the first fiber optic cable;
a distal circulator optically connected to the distal WDM; and
one or more downhole sensing fibers optically connectable to the distal circulator at the OFS.

20. A fiber optic sensing (FOS) system comprising:
a Brillouin Optical Time Domain Analyzer (BOTDA) unit;

a first fiber optical cable optically connected to the BOTDA interrogator unit at a first end;

an optical feedthrough system (OFS) optically connected the first fiber optical cable at a second end of the first fiber optical cable;

a fiber optic cable forming a loop within a wellbore that is optically connected to the first fiber optical cable at the OFS; and a second fiber optical cable optically connected to the loop at the OFS and wherein the second fiber optical cable is optically connected to the BOTDA interrogator unit;

a Fiber Bragg Gratings (FBG) interrogator unit;

a distributed acoustic sensing (DAS) interrogator unit a proximal circulator optically connected to the FBG interrogator unit and the DAS interrogator unit;

a proximal wavelength division multiplexer (WDM) optically connected to the proximal circulator and the BOTDA interrogator unit;

a distal WDM optically connected to the proximal WDM by the first fiber optic cable;

a distal circulator optically connected to the distal WDM; and one or more downhole sensing fibers optically connectable to the distal circulator at the OFS.

\* \* \* \* \*